(12) United States Patent
Huang

(10) Patent No.: US 10,466,447 B2
(45) Date of Patent: Nov. 5, 2019

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/217,856

(22) Filed: Dec. 12, 2018

(65) Prior Publication Data

US 2019/0113716 A1    Apr. 18, 2019

Related U.S. Application Data

(63) Continuation of application No. 15/960,026, filed on Apr. 23, 2018, now Pat. No. 10,191,250, which is a continuation of application No. 15/096,967, filed on Apr. 12, 2016, now Pat. No. 10,073,249.

(30) Foreign Application Priority Data

Jan. 22, 2016  (TW) .............................. 105102089 A

(51) Int. Cl.
 *G02B 3/02* (2006.01)
 *G02B 13/18* (2006.01)
 *G02B 13/00* (2006.01)
 *G02B 9/62* (2006.01)

(52) U.S. Cl.
 CPC ........... *G02B 13/0045* (2013.01); *G02B 9/62* (2013.01)

(58) Field of Classification Search
 CPC ...... G02B 13/0045; G02B 13/18; G02B 9/62; G02B 3/04
 See application file for complete search history.

(56) References Cited

U.S. PATENT DOCUMENTS 5,475,536 A * 12/1995 Kikutani ................ G02B 9/08
                                                           359/717
9,057,865 B1 * 6/2015 Hsu ..................... G02B 13/0045
9,690,076 B2 * 6/2017 Huang ..................... G02B 9/62
(Continued)

FOREIGN PATENT DOCUMENTS

CN        101408664 A    4/2009
CN        104238074 A    12/2014
(Continued)

*Primary Examiner* — William R Alexander
*Assistant Examiner* — Tamara Y. Washington
(74) *Attorney, Agent, or Firm* — Maschoff Brennan

(57) ABSTRACT

An optical imaging lens assembly includes, in order from an object side to an image side, a first lens element, a second lens element, a third lens element, a fourth lens element, a fifth lens element and a sixth lens element. The second lens element has positive refractive power. The third lens element has positive refractive power. The fourth lens element has positive refractive power. The fifth lens element has positive refractive power. The sixth lens element has an image-side surface being concave in a paraxial region thereof, wherein the image-side surface of the sixth lens element has at least one inflection point. The optical imaging lens assembly has a total of six lens elements.

37 Claims, 29 Drawing Sheets

(56) References Cited

U.S. PATENT DOCUMENTS

| | | | |
|---|---|---|---|
| 2010/0165485 A1* | 7/2010 | Do | G02B 1/00 359/716 |
| 2013/0003193 A1 | 1/2013 | Huang | |
| 2014/0071543 A1* | 3/2014 | Shinohara | G02B 13/18 359/713 |
| 2015/0062721 A1* | 3/2015 | Kim | G02B 13/0045 359/713 |
| 2015/0098135 A1 | 4/2015 | Chung et al. | |
| 2015/0109685 A1* | 4/2015 | Shinohara | G02B 9/60 359/714 |
| 2015/0177485 A1* | 6/2015 | Hsu | G02B 13/0045 348/360 |
| 2015/0346461 A1 | 12/2015 | Chen et al. | |
| 2015/0362703 A1* | 12/2015 | Park, II | G02B 13/0045 359/713 |
| 2016/0033745 A1 | 2/2016 | Chen et al. | |
| 2016/0077313 A1* | 3/2016 | Komiyama | G02B 13/06 359/752 |
| 2016/0124187 A1 | 5/2016 | Chen et al. | |
| 2016/0124191 A1* | 5/2016 | Hashimoto | G02B 13/0045 359/708 |
| 2016/0154210 A1 | 6/2016 | Baik et al. | |
| 2016/0223796 A1 | 8/2016 | Lee et al. | |
| 2016/0223797 A1 | 8/2016 | Zhao | |
| 2017/0031133 A1* | 2/2017 | Liu | G02B 27/646 |
| 2017/0031134 A1* | 2/2017 | Liu | G02B 13/06 |
| 2017/0102523 A1 | 4/2017 | Chen et al. | |
| 2017/0108666 A1 | 4/2017 | Lee | |
| 2017/0184818 A1 | 6/2017 | Dai et al. | |

FOREIGN PATENT DOCUMENTS

| | | |
|---|---|---|
| CN | 104991331 A | 10/2015 |
| CN | 106597636 A | 4/2017 |
| JP | 2014-010399 A | 1/2014 |
| JP | 2014-010400 A | 1/2014 |
| JP | 2014-010401 A | 1/2014 |

\* cited by examiner

US 10,466,447 B2

OPTICAL IMAGING LENS ASSEMBLY, IMAGE CAPTURING UNIT AND ELECTRONIC DEVICE

RELATED APPLICATIONS

This application is a continuation patent application of U.S. application Ser. No. 15/960,026, filed on Apr. 23, 2018, which is a continuation patent application of U.S. application Ser. No. 15/096,967, filed on Apr. 12, 2016, which claims priority to Taiwan Application 105102089, filed on Jan. 22, 2016, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

The optical systems have been widely applied to different kinds of electronic devices, such as smartphones, wearable devices, tablet personal computers, dashboard cameras, aerial photographic cameras and image recognition systems, for various requirements. However, the conventional compact optical system is unable to satisfy the requirements of wide field of view and high image resolution simultaneously. Thus, there is a need to develop an optical system featuring a wide view angle with high image resolution.

SUMMARY

According to one aspect of the present disclosure, an optical imaging lens assembly includes, in order from an object side to an image side, a first lens element, a second lens element, a third lens element, a fourth lens element, a fifth lens element and a sixth lens element. The second lens element has positive refractive power. The third lens element has positive refractive power. The fourth lens element has positive refractive power. The fifth lens element has positive refractive power. The sixth lens element has an image-side surface being concave in a paraxial region thereof, wherein the image-side surface of the sixth lens element has at least one inflection point. The optical imaging lens assembly has a total of six lens elements, and the optical imaging lens assembly further includes an aperture stop. When an axial distance between the aperture stop and the image-side surface of the sixth lens element is SD, an axial distance between an object-side surface of the first lens element and the image-side surface of the sixth lens element is TD, the following condition is satisfied:

$0.65 < SD/TD$.

According to another aspect of the present disclosure, an image capturing unit includes the aforementioned optical imaging lens assembly and an image sensor, wherein the image sensor is disposed on an image surface of the optical imaging lens assembly.

According to still another aspect of the present disclosure, an electronic device includes the aforementioned image capturing unit.

According to yet still another aspect of the present disclosure, an optical imaging lens assembly includes, in order from an object side to an image side, a first lens element, a second lens element, a third lens element, a fourth lens element, a fifth lens element and a sixth lens element. The second lens element has positive refractive power. The third lens element has positive refractive power. The fourth lens element has positive refractive power. The fifth lens element has positive refractive power. The sixth lens element has an image-side surface being concave in a paraxial region thereof, wherein the image-side surface of the sixth lens element has at least one inflection point. The optical imaging lens assembly has a total of six lens elements, and each of the lens elements of the optical imaging lens assembly is a single and non-cemented lens element. When a focal length of the optical imaging lens assembly is f, an axial distance between an object-side surface of the first lens element and an image surface is TL, the following condition is satisfied:

$0.70 < TL/f < 2.85$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
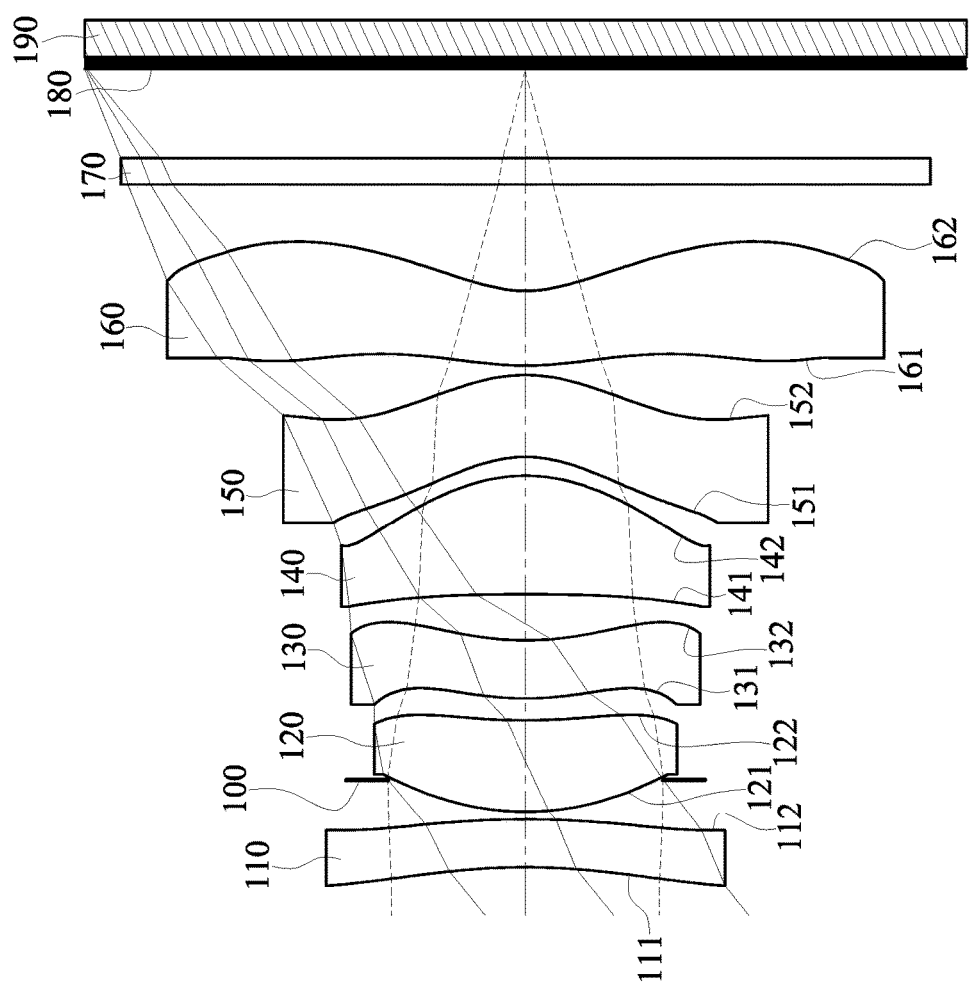
FIG. 1 is a schematic view of an image capturing unit according to the 1st embodiment of the present disclosure.

An optical imaging lens assembly includes, in order from an object side to an image side, a first lens element, a second lens element, a third lens element, a fourth lens element, a fifth lens element and a sixth lens element. The optical imaging lens assembly has a total of six lens elements.

There can be an air gap in a paraxial region between every two lens elements of the optical imaging lens assembly that are adjacent to each other; that is, each of the first through the sixth lens elements can be a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there can be an air gap in a paraxial region between every two lens elements of the optical imaging lens assembly that are adjacent to each other in the present disclosure for solving the problem generated by the cemented lens elements.

The first lens element has an object-side surface and an image-side surface, wherein at least one of the object-side surface and the image-side surface of the first lens element can have at least one inflection point. Therefore, it is favorable for correcting aberrations at the off-axis region.

The second lens element with positive refractive power can have an object-side surface being convex in a paraxial region thereof. Therefore, it is favorable for providing sufficient capability to converge the incident light on the object side so as to reduce a total track length, thereby maintaining a compact size thereof.

The third lens element with positive refractive power has an object-side surface and an image-side surface, wherein at least one of the object-side surface and the image-side surface of the third lens element can have at least one inflection point. Therefore, the third lens element arranged with the second lens element is favorable for balancing the light converging capability of the lens elements on the object side so as to prevent excessive aberrations generated by any single lens element of the optical imaging lens assembly having overly strong refractive power.

The fourth lens element with positive refractive power can have an object-side surface being concave in a paraxial region thereof and an image-side surface being convex in a paraxial region thereof. Therefore, it is favorable for being more symmetrical with the third lens element so as to correct aberrations.

The fifth lens element with positive refractive power can have an object-side surface being concave in a paraxial region thereof and an image-side surface being convex in a paraxial region thereof. Therefore, it is favorable for the lens configuration of the optical imaging lens assembly with better symmetry so as to reduce the sensitivity.

The sixth lens element can have negative refractive power; therefore, it is favorable for correcting Petzval sum so as to improve the flatness of the image surface. Furthermore, the sixth lens element can have an image-side surface being concave in a paraxial region thereof; therefore, it is favorable for moving the principal point of the optical imaging lens assembly towards the object side so as to reduce a back focal length, thereby further reducing the total track length. Moreover, the image-side surface of the sixth lens element has at least one inflection point; therefore, it is favorable for further correcting aberrations at the off-axis region.

The optical imaging lens assembly can include an aperture stop. When an axial distance between the aperture stop and the image-side surface of the sixth lens element is SD, an axial distance between the object-side surface of the first lens element and the image-side surface of the sixth lens element is TD, the following condition can be satisfied: $0.65 < SD/TD$. Therefore, it is favorable for the placement of the aperture stop so as to control the direction of the light path effectively, thereby providing sufficient field of view and image height.

When a focal length of the optical imaging lens assembly is f, an axial distance between the object-side surface of the first lens element and an image surface is TL, the following condition can be satisfied: $0.70 < TL/f < 2.85$. Therefore, it is favorable for providing a wider field of view and keeping the optical imaging lens assembly compact. Preferably, the following condition can also be satisfied: $0.70 < TL/f < 2.45$. More preferably, the following condition can also be satisfied: $0.70 < TL/f \leq 1.66$.

When half of a maximal field of view of the optical imaging lens assembly is HFOV, the following condition can be satisfied: $0.70 < \tan(HFOV) < 0.98$. Therefore, it is favorable for enlarging an imaging area of the optical imaging lens assembly and correcting distortion.

When a curvature radius of the image-side surface of the fifth lens element is R10, a curvature radius of an object-side surface of the sixth lens element is R11, the following conditions can be satisfied: $-0.95<R10/R11<0.85$. Therefore, it is favorable for properly arranging the lens shapes so as to provide a better optimized lens configuration.

When a focal length of the first lens element is f1, a focal length of the fourth lens element is f4, the following condition can be satisfied: $-0.80<f4/f1$. Therefore, it is favorable for properly arranging the refractive power distribution of the optical imaging lens assembly so as to prevent severe aberrations on the object side.

When the focal length of the first lens element is f1, a focal length of the sixth lens element is f6, the following condition can be satisfied: $-5.0<f6/f1<0.50$. Therefore, it is favorable for balancing the refractive power distribution between the object side and the image side so as to enhance the capability to optimize the optical characteristics on the image side, thereby improving the image quality.

When a curvature radius of the object-side surface of the fourth lens element is R7, a curvature radius of the image-side surface of the fourth lens element is R8, the following condition can be satisfied: $0<(R7+R8)/(R7-R8)<5.0$. Therefore, it is favorable for preventing the surfaces of the fourth lens element from overly curved and related molding problems, thereby increasing the manufacturing yield rate.

When a focal length of the second lens element is f2, a focal length of the third lens element is f3, the following condition can be satisfied: $0<f2/f3<1.50$. Therefore, it is favorable for optimizing the optical characteristics of the second lens element so as to maintain a compact size thereof.

When a central thickness of the first lens element is CT1, an axial distance between the first lens element and the second lens element is T12, an axial distance between the second lens element and the third lens element is T23, the following condition can be satisfied: $0.20<(T12+T23)/CT1<1.50$. Therefore, it is favorable for improving the space utilization in the optical imaging lens assembly so as to provide sufficient space for lens assembling, thereby increasing the assembling yield rate.

When a maximum axial distance among all axial distances between every two lens elements of the optical imaging lens assembly that are adjacent to each other is ATmax, a minimum central thickness among all central thicknesses of the lens elements of the optical imaging lens assembly is CTmin, the following condition can be satisfied: $ATmax/CTmin<2.0$. Therefore, it is favorable for proper lens configurations according to the sizes and the thicknesses of the lens elements so as to obtain a better assembling process with efficient space utilizations.

Figure 25:
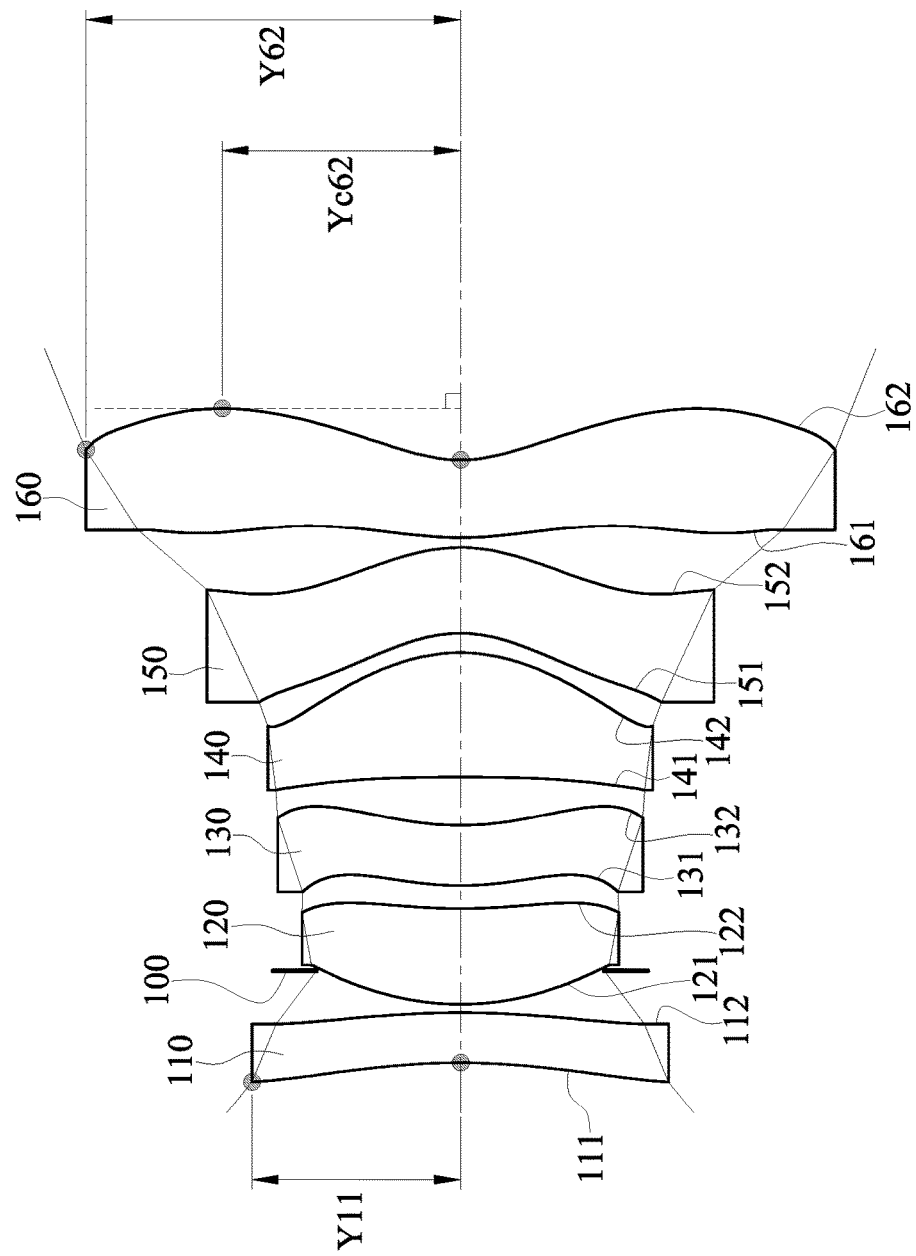
FIG. 25 shows a schematic view of the parameters Y11, Y62 and Yc62 according to the 1st embodiment of the present disclosure.
Figure 26:
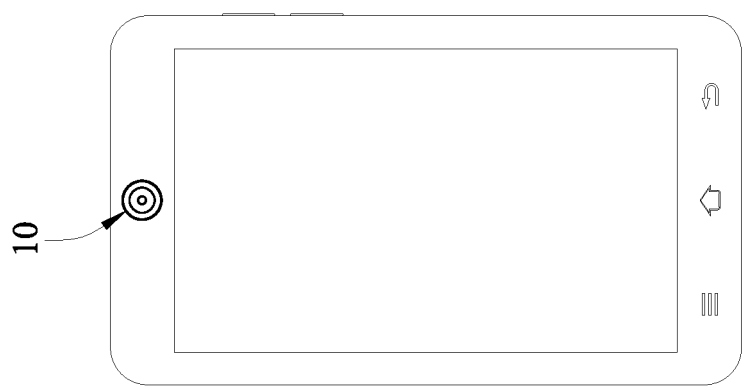
FIG. 26 shows an electronic device according to one embodiment.
Figure 27:
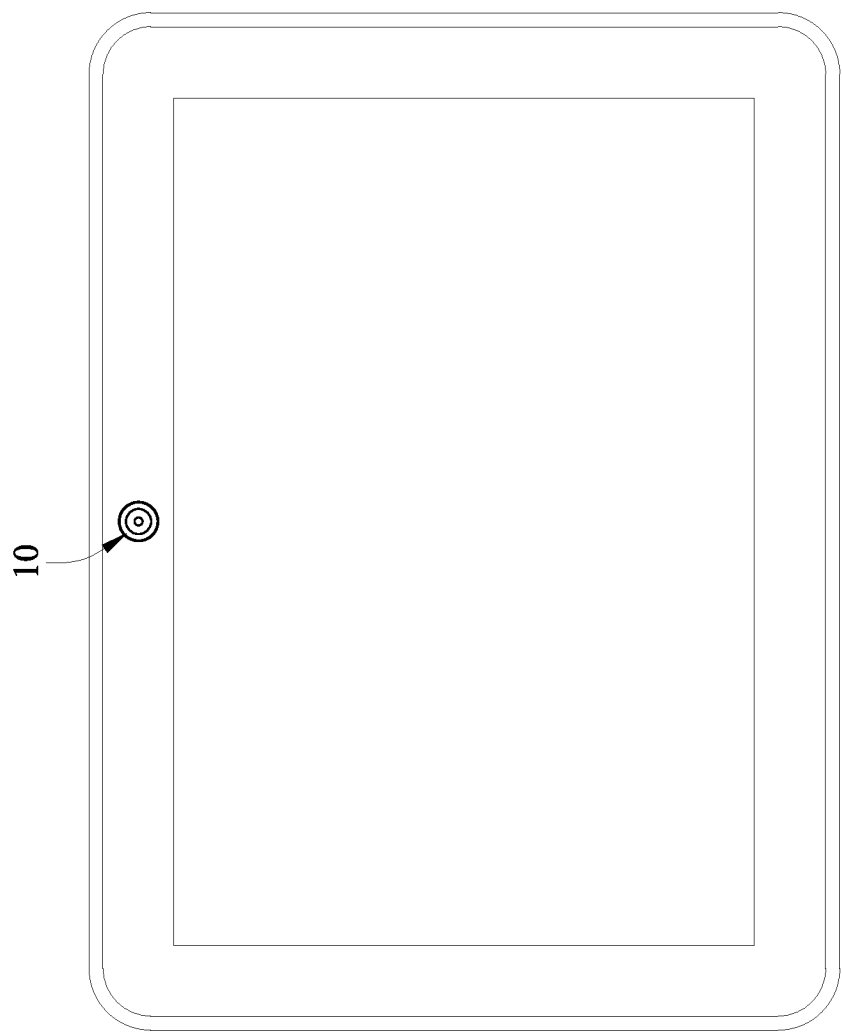
FIG. 27 shows an electronic device according to another embodiment.
Figure 28:
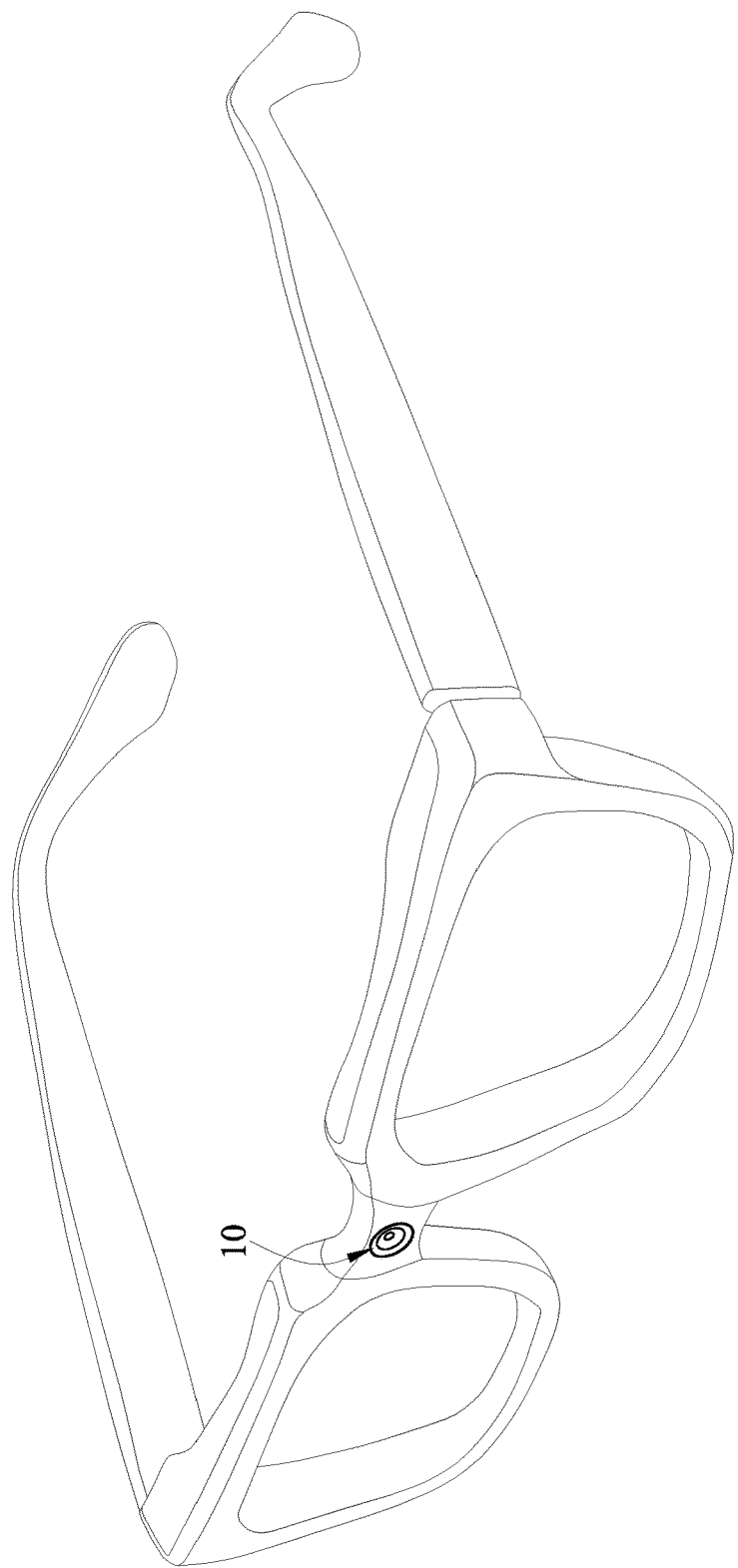
FIG. 28 shows an electronic device according to still another embodiment.

When a maximum effective radius of the object-side surface of the first lens element is Y11, a maximum effective radius of the image-side surface of the sixth lens element is Y62, the following condition can be satisfied: $Y11/Y62<0.90$. Therefore, it is favorable for controlling the optical path, and providing sufficient image height and larger imaging area so as to improve the image brightness. As seen in FIG. 25, FIG. 25 shows a schematic view of the parameters Y11 and Y62 according to the 1st embodiment of the present disclosure.

When a focal length of the fifth lens element is f5, the focal length of the sixth lens element is f6, the following condition can be satisfied: $-0.85<f6/f5<2.0$. Therefore, it is favorable for balancing the refractive power distribution between the object side and the image side so as to optimize the optical characteristics on the image side, thereby reducing the total track length.

According to the disclosure, at least two of the lens elements of the optical imaging lens assembly that each can have an Abbe number less than 30. That is, two or more of the Abbe numbers of the first through the sixth lens elements can be less than 30. Therefore, it is favorable for balancing the focusing positions with different wavelengths so as to prevent blur effects on the image.

When the axial distance between the second lens element and the third lens element is T23, an axial distance between the third lens element and the fourth lens element is T34, an axial distance between the fourth lens element and the fifth lens element is T45, the following condition can be satisfied: $0.45<T34/(T23+T45)$. Therefore, it is favorable for the configuration of the optical imaging lens assembly being more symmetrical so as to further improve the image quality.

When the maximum axial distance among all axial distances between every two lens elements of the optical imaging lens assembly that are adjacent to each other is ATmax, a maximum image height of the optical imaging lens assembly (half of a diagonal length of an effective photosensitive area of the image sensor) is ImgH, and the following condition is satisfied: $ATmax/ImgH \leq 0.23$. Therefore, it is favorable for the space utilization of the optical imaging lens assembly while providing a sufficient imaging area.

When the maximum axial distance among all axial distances between every two lens elements of the optical imaging lens assembly that are adjacent to each other is ATmax, a maximum central thickness among all central thicknesses of the lens elements of the optical imaging lens assembly is CTmax, the following condition can be satisfied: $1.1<CTmax/ATmax<5.0$. Therefore, it is favorable for properly arranging the lens elements while reducing the sensitivity.

When the axial distance between the object-side surface of the first lens element and the image-side surface of the sixth lens element is TD, a vertical distance between a non-axial critical point on the image-side surface of the sixth lens element and an optical axis is Yc62, the following condition can be satisfied: $1.0<TD/Yc62<4.0$. Therefore, it is favorable for correcting aberrations at the off-axis region and preventing the field curvature. As seen in FIG. 25, FIG. 25 shows a schematic view of the parameter Yc62 according to the 1st embodiment of the present disclosure. A critical point of a lens element is a non-axial point of the lens surface where its tangent is perpendicular to the optical axis. The critical point on the image-side surface of the sixth lens element is a non-axial point on the image-side surface of the sixth lens element where its tangent is perpendicular to the optical axis. Specifically, the critical points mentioned above are not located on the optical axis.

When the curvature radius of the object-side surface of the sixth lens element is R11, a curvature radius of the image-side surface of the sixth lens element is R12, the following condition can be satisfied: $0.50<(R11+R12)/(R11-R12)<2.80$. Therefore, it is favorable for keeping the surface shapes of the sixth lens element from overly curved and eliminating the stray light.

When a curvature radius of the object-side surface of the first lens element is R1, a curvature radius of the image-side surface of the first lens element is R2, the following condition can be satisfied: $(R1-R2)/(R1+R2)<0.50$. Therefore, it is favorable for the surface shapes of the first lens element to correct astigmatism.

When the focal length of the optical imaging lens assembly is f, the axial distance between the first lens element and the second lens element is T12, the following condition can be satisfied: 0<T12/f<0.10. Therefore, it is favorable for reducing the axial distance between the first lens element and the second lens element so as to obtain compactness of the optical imaging lens assembly.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the optical imaging lens assembly can be made of glass or plastic material. When the lens elements are made of glass material, the refractive power distribution of the optical imaging lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the optical imaging lens assembly can also be reduced.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the optical imaging lens assembly on the corresponding image sensor can be flat or curved, particularly a concave curved surface facing towards the object side of the optical imaging lens assembly.

According to the present disclosure, the optical imaging lens assembly can include at least one stop, such as an aperture stop, a glare stop or a field stop. Said glare stop or said field stop is allocated for eliminating the stray light and thereby improving the image quality thereof.

According to the present disclosure, an image capturing unit includes the aforementioned optical imaging lens assembly and an image sensor, wherein the image sensor is disposed on the image side and can be located on or near an image surface of the aforementioned optical imaging lens assembly. In some embodiments, the image capturing unit can further include a barrel member, a holding member or a combination thereof.

Figure 29:
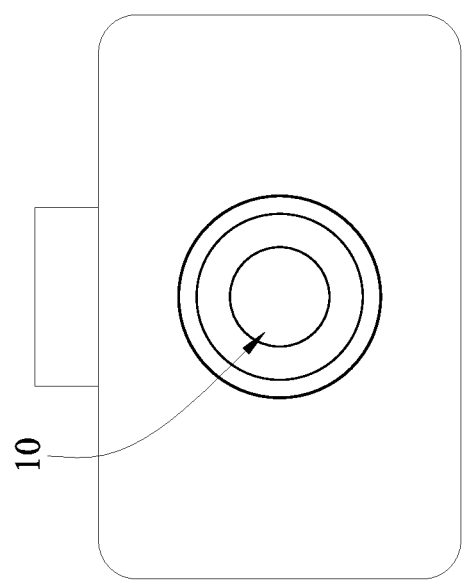
FIG. 29 shows an electronic device according to yet still another embodiment.

In FIG. 26, FIG. 27, FIG. 28 and FIG. 29, an image capturing unit 10 may be installed in, but not limited to, an electronic device, including a smart phone (FIG. 26), a tablet personal computer (FIG. 27), a wearable device (FIG. 28) or a dashboard camera (FIG. 29). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the optical imaging lens assembly can be optionally applied to optical systems with a movable focus. Furthermore, the optical imaging lens assembly is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
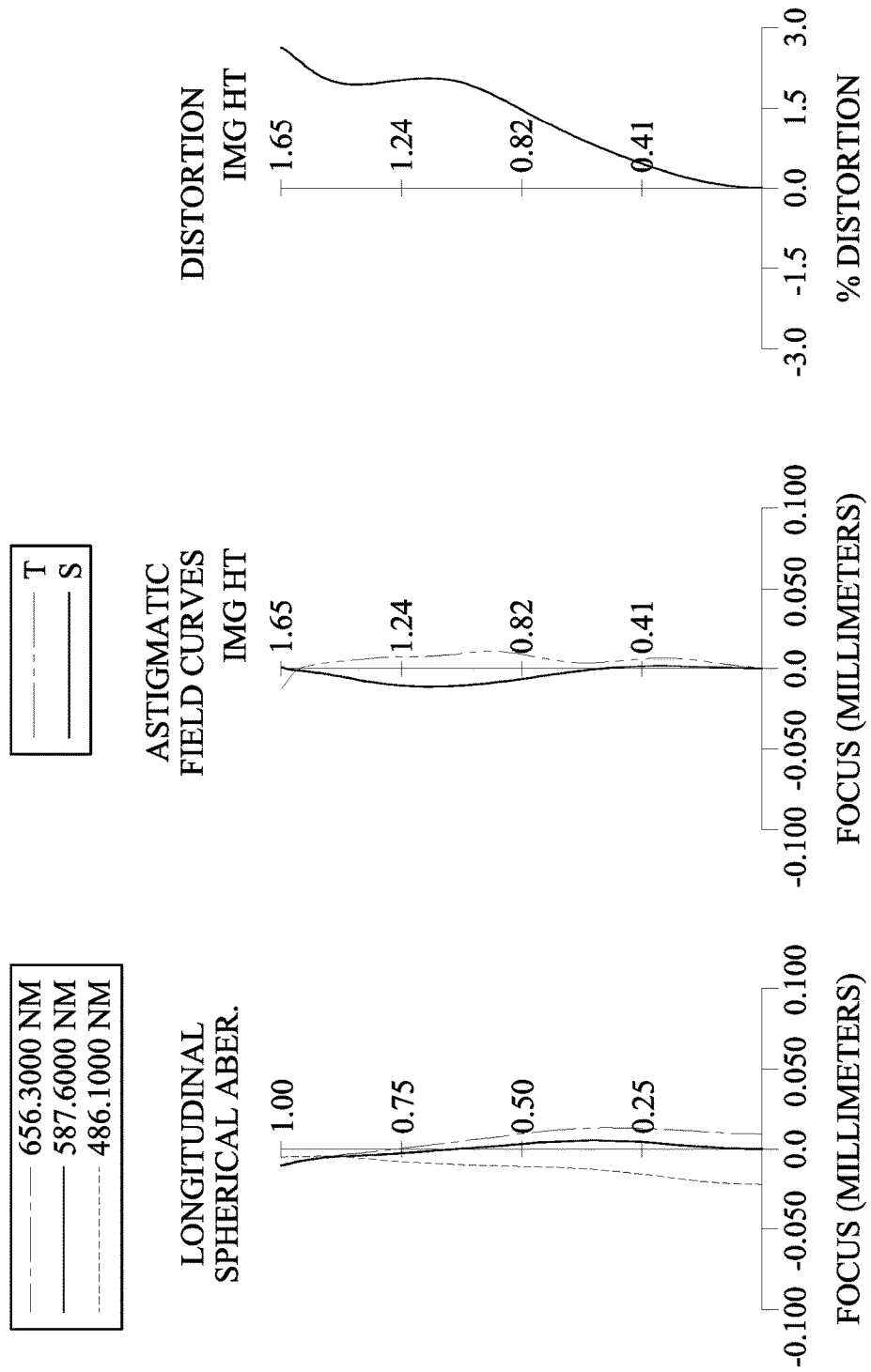
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 190. The optical imaging lens assembly includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image surface 180, wherein the optical imaging lens assembly has a total of six lens elements (110-160).

The first lens element 110 with negative refractive power has an object-side surface 111 being concave in a paraxial region thereof and an image-side surface 112 being convex in a paraxial region thereof. The first lens element 110 is made of plastic material and has the object-side surface 111 and the image-side surface 112 being both aspheric. Both the object-side surface 111 and the image-side surface 112 of the first lens element 110 have at least one inflection point.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. Both the object-side surface 131 and the image-side surface 132 of the third lens element 130 have at least one inflection point.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one inflection point.

In this embodiment, two of the lens elements in the optical imaging lens assembly have an Abbe number less than 30. As shown in Table 1, both the third lens element 130 and the fifth lens element 150 have an Abbe number less than 30.

The IR-cut filter 170 is made of glass material and located between the sixth lens element 160 and the image surface 180, and will not affect the focal length of the optical imaging lens assembly. The image sensor 190 is disposed on or near the image surface 180 of the optical imaging lens assembly.

The equation of the aspheric surface profiles of the aforementioned lens elements of the 1st embodiment is expressed as follows:

$$X(Y) = (Y^2/R)/(1 + \operatorname{sqrt}(1 - (1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens assembly of the image capturing unit according to the 1st embodiment, when a focal length of the optical imaging lens assembly is f, an f-number of the optical imaging lens assembly is Fno, and half of a maximal field of view of the optical imaging lens assembly is HFOV, these parameters have the following values: f=1.96 millimeters (mm); Fno=1.95; and HFOV=39.3 degrees (deg.).

When a central thickness of the first lens element 110 is CT1, an axial distance between the first lens element 110 and the second lens element 120 is T12, an axial distance between the second lens element 120 and the third lens element 130 is T23, the following condition is satisfied: (T12+T23)/CT1=0.62.

When the axial distance between the second lens element 120 and the third lens element 130 is T23, an axial distance between the third lens element 130 and the fourth lens element 140 is T34, an axial distance between the fourth lens element 140 and the fifth lens element 150 is T45, the following condition is satisfied: T34/(T23+T45)=1.14.

When the axial distance between the first lens element 110 and the second lens element 120 is T12, the focal length of the optical imaging lens assembly is f, the following condition is satisfied: T12/f=0.02.

When a maximum axial distance among all axial distances between every two lens elements of the optical imaging lens assembly that are adjacent to each other is ATmax, a maximum central thickness among all central thicknesses of the lens elements (110-160) of the optical imaging lens assembly is CTmax, and the following condition is satisfied: CTmax/ATmax=2.58. In this embodiment, CTmax is equal to the central thickness of the fourth lens element 140, which is the largest central thickness of the optical imaging lens assembly. Furthermore, ATmax is equal to the axial distance between the third lens element 130 and the fourth lens element 140, which is the largest axial distance between any two adjacent lens elements of the optical imaging lens assembly.

When the maximum axial distance among all axial distances between every two lens elements of the optical imaging lens assembly that are adjacent to each other is ATmax, a minimum central thickness among all central thicknesses of the lens elements (110-160) of the optical imaging lens assembly is CTmin, the following condition is satisfied: ATmax/CTmin=0.96. In this embodiment, CTmin is equal to the central thickness of the first lens element 110, which is the smallest central thickness of the optical imaging lens assembly.

When the maximum axial distance among all axial distances between every two lens elements of the optical imaging lens assembly that are adjacent to each other is ATmax, a maximum image height of the optical imaging lens assembly is ImgH, the following condition is satisfied: ATmax/ImgH=0.10.

When a curvature radius of the object-side surface 111 of the first lens element 110 is R1, a curvature radius of the image-side surface 112 of the first lens element 110 is R2, the following condition is satisfied: (R1−R2)/(R1+R2)=−0.18.

When a curvature radius of the object-side surface 141 of the fourth lens element 140 is R7, a curvature radius of the image-side surface 142 of the fourth lens element 140 is R8, the following condition is satisfied: (R7+R8)/(R7−R8)=1.13.

When a curvature radius of the object-side surface 161 of the sixth lens element 160 is R11, a curvature radius of the image-side surface 162 of the sixth lens element 160 is R12, the following condition is satisfied: (R11+R12)/(R11−R12)=2.31.

When a curvature radius of the image-side surface 152 of the fifth lens element 150 is R10, the curvature radius of the object-side surface 161 of the sixth lens element 160 is R11, the following condition is satisfied: R10/R11=−0.46.

When a focal length of the second lens element 120 is f2, a focal length of the third lens element 130 is f3, the following condition is satisfied: f2/f3=0.19.

When a focal length of the first lens element 110 is f1, a focal length of the fourth lens element 140 is f4, the following condition is satisfied: f4/f1=−0.08.

When a focal length of the fifth lens element 150 is f5, a focal length of the sixth lens element 160 is f6, the following condition is satisfied: f6/f5=−0.11.

When the focal length of the first lens element 110 is f1, the focal length of the sixth lens element 160 is f6, the following condition is satisfied: f6/f1=0.11.

When a maximum effective radius of the object-side surface 111 of the first lens element 110 is Y11, a maximum effective radius of the image-side surface 162 of the sixth lens element 160 is Y62, the following condition is satisfied: Y11/Y62=0.56.

When an axial distance between the aperture stop 100 and the image-side surface 162 of the sixth lens element 160 is SD, an axial distance between the object-side surface 111 of the first lens element 110 and the image-side surface 162 of the sixth lens element 160 is TD, the following condition is satisfied: SD/TD=0.85.

When the axial distance between the object-side surface 111 of the first lens element 110 and the image-side surface 162 of the sixth lens element 160 is TD, a vertical distance between a non-axial critical point on the image-side surface 162 of the sixth lens element 160 and an optical axis is Yc62, the following condition is satisfied: TD/Yc62=2.53.

When the focal length of the optical imaging lens assembly is f, an axial distance between the object-side surface 111 of the first lens element 110 and the image surface 180 is TL, the following condition is satisfied: TL/f=1.53.

When half of the maximal field of view of the optical imaging lens assembly is HFOV, the following condition is satisfied: tan(HFOV)=0.82.

The detailed optical data of the 1st embodiment are shown in Table 1 and the aspheric surface data are shown in Table 2 below.

TABLE 1

1st Embodiment
f = 1.96 mm, Fno = 1.95, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.368 | (ASP) | 0.180 | Plastic | 1.544 | 55.9 | −15.25 |
| 2 | | −3.402 | (ASP) | 0.150 | | | | |
| 3 | Ape. Stop | Plano | | −0.120 | | | | |
| 4 | Lens 2 | 1.008 | (ASP) | 0.343 | Plastic | 1.544 | 55.9 | 3.41 |
| 5 | | 1.940 | (ASP) | 0.082 | | | | |
| 6 | Lens 3 | 1.083 | (ASP) | 0.218 | Plastic | 1.640 | 23.3 | 18.38 |
| 7 | | 1.099 | (ASP) | 0.173 | | | | |
| 8 | Lens 4 | −10.368 | (ASP) | 0.447 | Plastic | 1.544 | 55.9 | 1.21 |
| 9 | | −0.627 | (ASP) | 0.070 | | | | |
| 10 | Lens 5 | −0.482 | (ASP) | 0.308 | Plastic | 1.640 | 23.3 | 15.60 |
| 11 | | −0.575 | (ASP) | 0.035 | | | | |
| 12 | Lens 6 | 1.236 | (ASP) | 0.280 | Plastic | 1.544 | 55.9 | −1.72 |
| 13 | | 0.490 | (ASP) | 0.400 | | | | |
| 14 | IR-cut filter | Plano | | 0.100 | Glass | 1.517 | 64.2 | — |
| 15 | | Plano | | 0.335 | | | | |
| 16 | Image | Plano | | — | | | | |

Note:
Reference wavelength is 587.6 nm (d-line).

TABLE 2

Aspheric Coefficients

| Surface # | | | | | |
|---|---|---|---|---|---|
| 1 | 2 | 4 | 5 | 6 | 7 |

| | 1 | 2 | 4 | 5 | 6 | 7 |
|---|---|---|---|---|---|---|
| k = | −2.1522E+01 | −1.9205E+01 | −3.2366E−01 | 2.6515E+00 | 6.2976E−02 | −7.5591E−01 |
| A4 = | 2.9738E−02 | 3.7739E−02 | −1.2458E−01 | −8.6632E−01 | −1.2392E+00 | −4.1128E−01 |
| A6 = | 6.2670E−03 | 4.5299E−02 | 6.6794E−01 | 6.2713E−02 | −1.1476E+00 | −2.1531E+00 |
| A8 = | 3.7595E−02 | 7.2555E−02 | −4.4923E+00 | −6.0251E−01 | −5.2051E+00 | 2.2866E+00 |
| A10 = | 9.4129E−02 | 1.1346E−01 | 1.6393E+01 | −5.7601E−01 | 2.3582E+01 | 1.2749E+01 |
| A12 = | −9.4638E−02 | −5.1833E−03 | −2.7252E+01 | −4.0948E+00 | −3.3750E+01 | −4.6951E+01 |
| A14 = | — | — | −1.4193E+00 | −1.0239E+01 | −1.7379E+01 | 3.8077E+01 |

| Surface # | | | | | |
|---|---|---|---|---|---|
| 8 | 9 | 10 | 11 | 12 | 13 |

| | 8 | 9 | 10 | 11 | 12 | 13 |
|---|---|---|---|---|---|---|
| k = | −3.0000E+01 | −1.2476E+00 | −2.7270E+00 | −4.4474E+00 | −3.9819E−01 | −5.3869E+00 |
| A4 = | −1.2055E−01 | 3.3374E−01 | 5.5224E−01 | 1.5436E−02 | −1.6035E+00 | −5.6950E−01 |
| A6 = | −8.7913E−01 | −5.6921E−01 | −2.0662E−01 | 1.8290E+00 | 3.9133E+00 | 1.1644E+00 |
| A8 = | 4.6518E+00 | 2.2708E+00 | 3.2787E+00 | −5.1084E+00 | −7.9805E+00 | −1.9128E+00 |
| A10 = | −9.2226E+00 | −6.6227E+00 | −1.9369E+01 | 8.8043E+00 | 1.0982E+01 | 2.0271E+00 |
| A12 = | 3.1721E−03 | 5.6085E+00 | 3.9296E+01 | −8.6140E+00 | −8.9149E+00 | −1.3249E+00 |
| A14 = | 3.8700E+01 | 1.0320E+01 | −3.4402E+01 | 3.5325E+00 | 3.8610E+00 | 4.8652E−01 |
| A16 = | −5.2461E+01 | — | 7.9822E+00 | −1.9181E−01 | −6.9325E−01 | −7.6119E−02 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 8th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
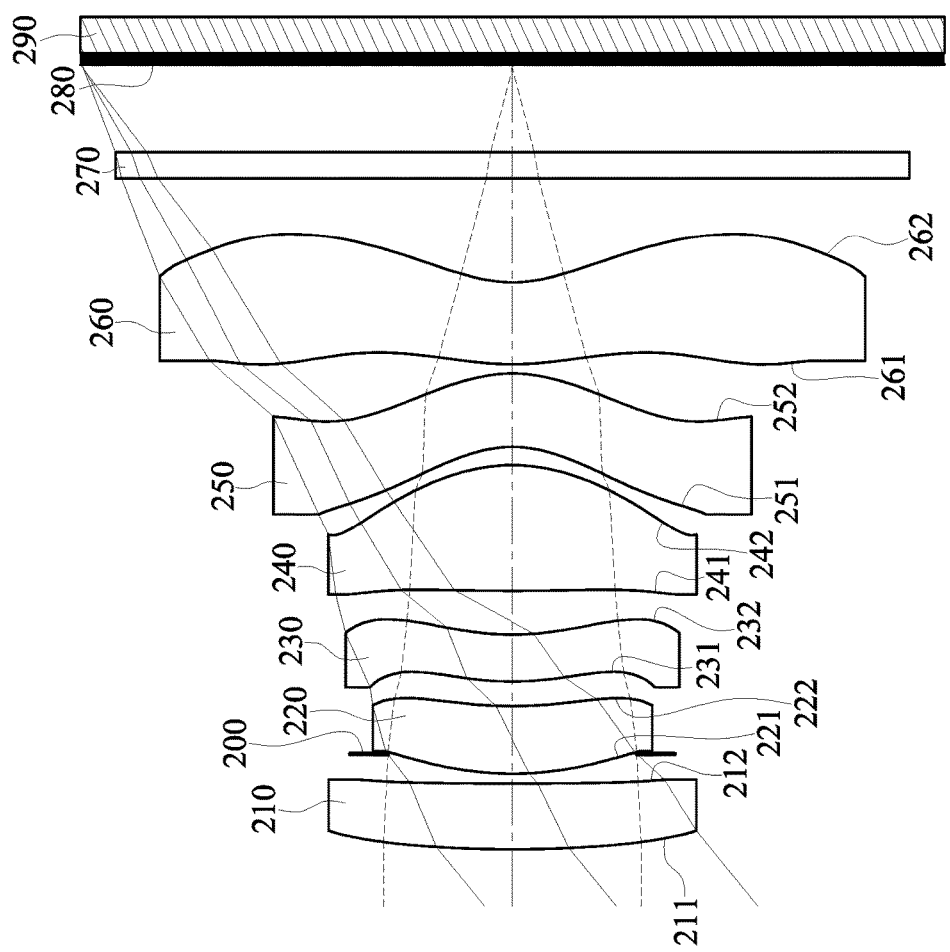
FIG. 3 is a schematic view of an image capturing unit according to the 2nd embodiment of the present disclosure.
Figure 4:
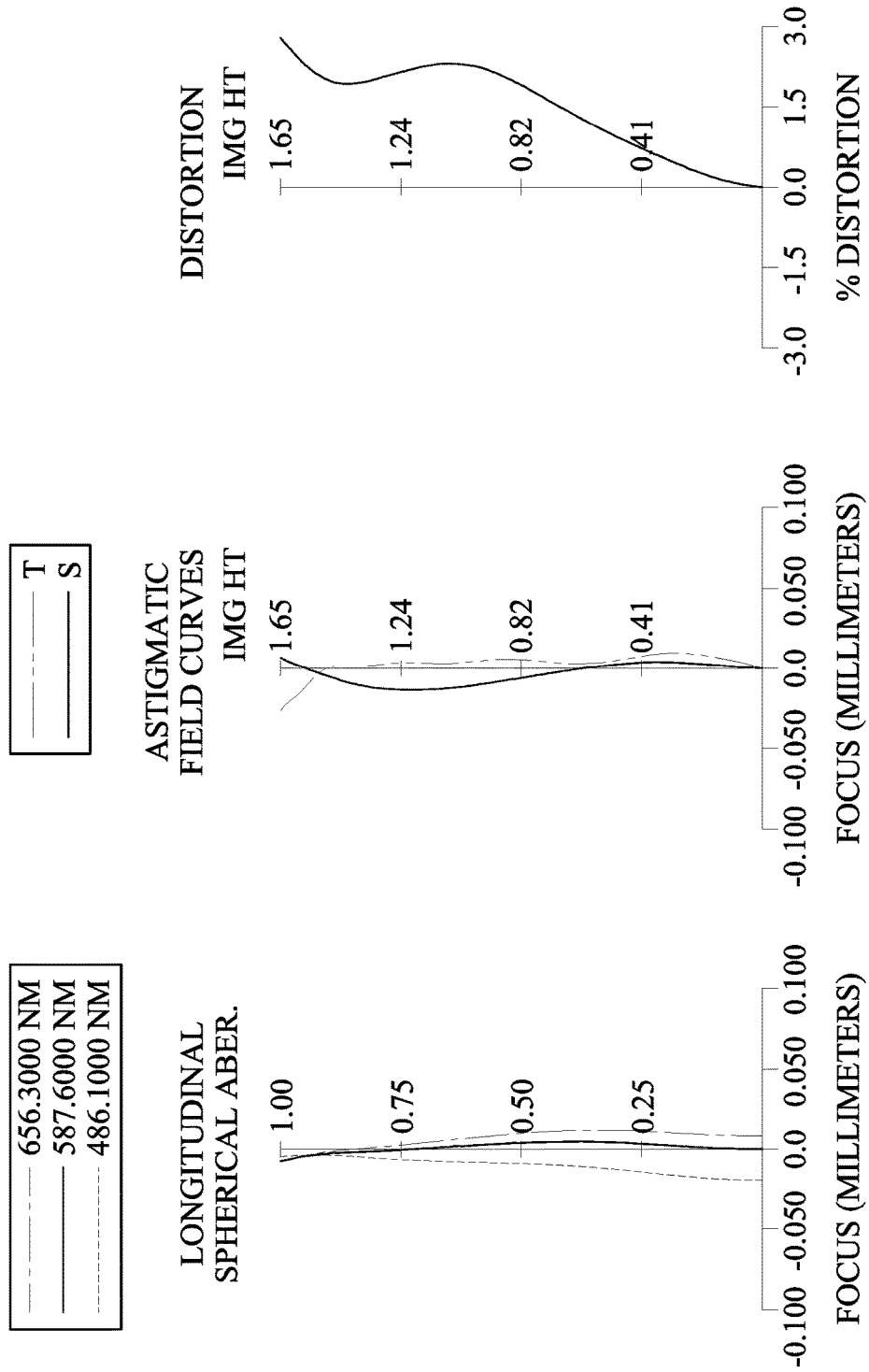
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 290. The optical imaging lens assembly includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image surface 280, wherein the optical imaging lens assembly has a total of six lens elements (210-260).

The first lens element 210 with positive refractive power has an object-side surface being 211 convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. Both the object-side surface 231 and the image-side surface 232 of the third lens element 230 have at least one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one inflection point.

In this embodiment, as shown in Table 3, both the third lens element 230 and the fifth lens element 250 have an Abbe number less than 30.

The IR-cut filter 270 is made of glass material and located between the sixth lens element 260 and the image surface 280, and will not affect the focal length of the optical imaging lens assembly. The image sensor 290 is disposed on or near the image surface 280 of the optical imaging lens assembly.

The detailed optical data of the 2nd embodiment are shown in Table 3 and the aspheric surface data are shown in Table 4 below.

TABLE 3

2nd Embodiment
f = 1.97 mm, Fno = 2.00, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.649 | (ASP) | 0.254 | Plastic | 1.544 | 55.9 | 11.14 |
| 2 | | 19.545 | (ASP) | 0.113 | | | | |
| 3 | Ape. Stop | Plano | | −0.075 | | | | |
| 4 | Lens 2 | 1.242 | (ASP) | 0.258 | Plastic | 1.544 | 55.9 | 10.57 |
| 5 | | 1.469 | (ASP) | 0.094 | | | | |
| 6 | Lens 3 | 1.066 | (ASP) | 0.180 | Plastic | 1.640 | 23.3 | 36.15 |
| 7 | | 1.044 | (ASP) | 0.167 | | | | |
| 8 | Lens 4 | 8.351 | (ASP) | 0.483 | Plastic | 1.544 | 55.9 | 1.19 |
| 9 | | −0.689 | (ASP) | 0.070 | | | | |
| 10 | Lens 5 | −0.464 | (ASP) | 0.281 | Plastic | 1.640 | 23.3 | 60.47 |
| 11 | | −0.566 | (ASP) | 0.035 | | | | |
| 12 | Lens 6 | 1.109 | (ASP) | 0.313 | Plastic | 1.544 | 55.9 | −2.02 |
| 13 | | 0.497 | (ASP) | 0.400 | | | | |
| 14 | IR-cut filter | Plano | | 0.100 | Glass | 1.517 | 64.2 | — |
| 15 | | Plano | | 0.335 | | | | |
| 16 | Image | Plano | | — | | | | |

Note:
Reference wavelength is 587.6 nm (d-line).

TABLE 4

Aspheric Coefficients

| | Surface # | | | | | |
|---|---|---|---|---|---|---|
| | 1 | 2 | 4 | 5 | 6 | 7 |
| k = | −3.5030E+00 | −3.0000E+01 | −8.3839E−01 | 6.1458E−01 | −8.3409E−01 | −4.1818E+00 |
| A4 = | 2.1926E−02 | −8.5260E−03 | −1.2621E−01 | −9.8841E−01 | −1.3598E+00 | −4.3285E−01 |
| A6 = | 3.1384E−02 | 7.3296E−02 | 3.5521E−01 | 7.2107E−01 | −2.6424E−01 | −1.7209E+00 |
| A8 = | 1.9083E−01 | 5.3906E−01 | −3.9558E+00 | −5.3940E+00 | −5.8306E+00 | 1.7604E+00 |
| A10 = | −5.3127E−02 | −2.6114E−01 | 1.3910E+01 | 8.6788E−01 | 1.4892E+01 | 1.0700E+01 |
| A12 = | −1.6043E−02 | −8.5207E−01 | −3.1694E+01 | 5.7676E−01 | −3.0491E+01 | −5.0554E+01 |
| A14 = | — | — | −1.4193E+00 | −1.0239E+01 | −1.7379E+01 | 5.3468E+01 |

| | Surface # | | | | | |
|---|---|---|---|---|---|---|
| | 8 | 9 | 10 | 11 | 12 | 13 |
| k = | 1.8506E+01 | −9.3396E−01 | −2.6704E+00 | −3.7300E+00 | −1.1654E+00 | −4.8666E+00 |
| A4 = | −1.0233E−01 | 2.2755E−01 | 3.2048E−01 | −2.8243E−02 | −1.7204E+00 | −5.9965E−01 |
| A6 = | −1.2346E+00 | −1.9211E−01 | 3.2656E−01 | 1.9418E+00 | 4.0163E+00 | 1.1662E+00 |
| A8 = | 4.2803E+00 | 2.0479E+00 | 3.3780E+00 | −5.0600E+00 | −7.9344E+00 | −1.8921E+00 |
| A10 = | −8.5988E+00 | −7.3388E+00 | −2.0089E+01 | 8.7504E+00 | 1.0971E+01 | 2.0176E+00 |
| A12 = | 1.9480E−01 | 4.8408E+00 | 3.9138E+01 | −8.6884E+00 | −8.9379E+00 | −1.3291E+00 |
| A14 = | 3.3765E+01 | 1.2340E+01 | −3.2862E+01 | 3.4993E+00 | 3.8516E+00 | 4.8737E−01 |
| A16 = | −3.1765E+01 | — | 8.2948E+00 | −1.2708E−01 | −6.8240E−01 | −7.5190E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.97 | (R11 + R12)/(R11 − R12) | 2.62 |
| Fno | 2.00 | R10/R11 | −0.51 |
| HFOV [deg.] | 39.2 | f2/f3 | 0.29 |
| (T12 + T23)/CT1 | 0.52 | f4/f1 | 0.11 |
| T34/(T23 + T45) | 1.02 | f6/f5 | −0.03 |
| T12/f | 0.02 | f6/f1 | −0.18 |
| CTmax/ATmax | 2.89 | Y11/Y62 | 0.52 |
| ATmax/CTmin | 0.93 | SD/TD | 0.83 |
| ATmax/ImgH | 0.10 | TD/Yc62 | 2.59 |
| (R1 − R2)/(R1 + R2) | −0.62 | TL/f | 1.53 |
| (R7 + R8)/(R7 − R8) | 0.85 | tan(HFOV) | 0.81 |

3rd Embodiment

Figure 5:
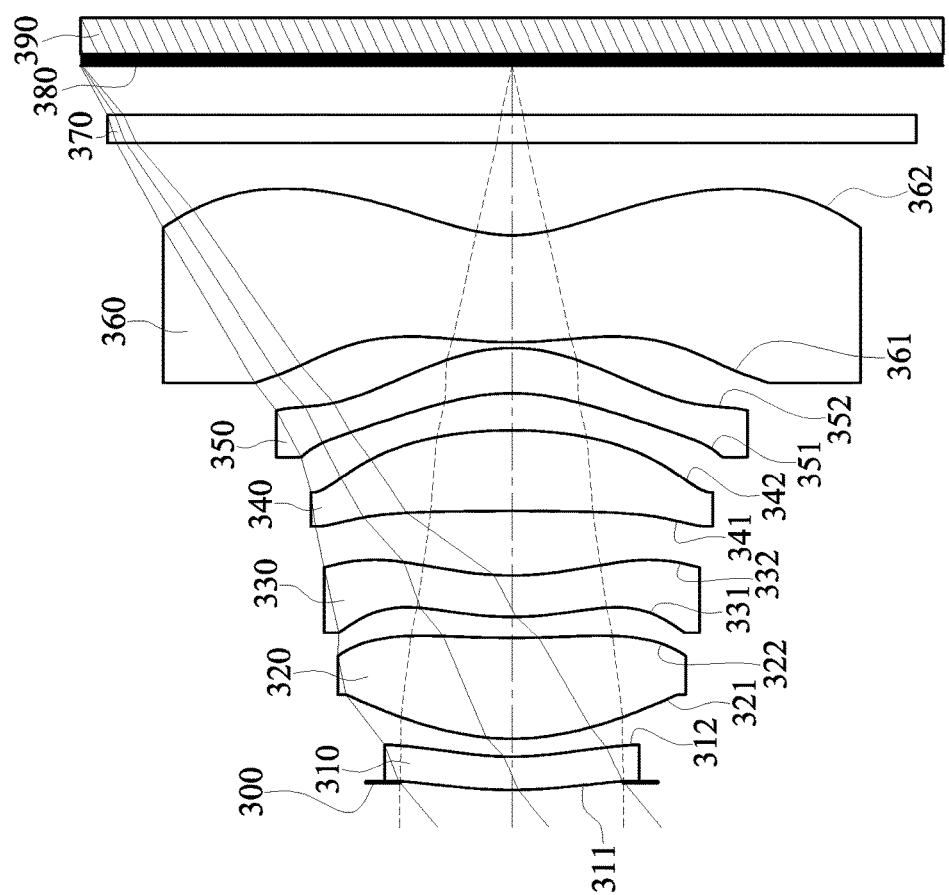
FIG. 5 is a schematic view of an image capturing unit according to the 3rd embodiment of the present disclosure.
Figure 6:
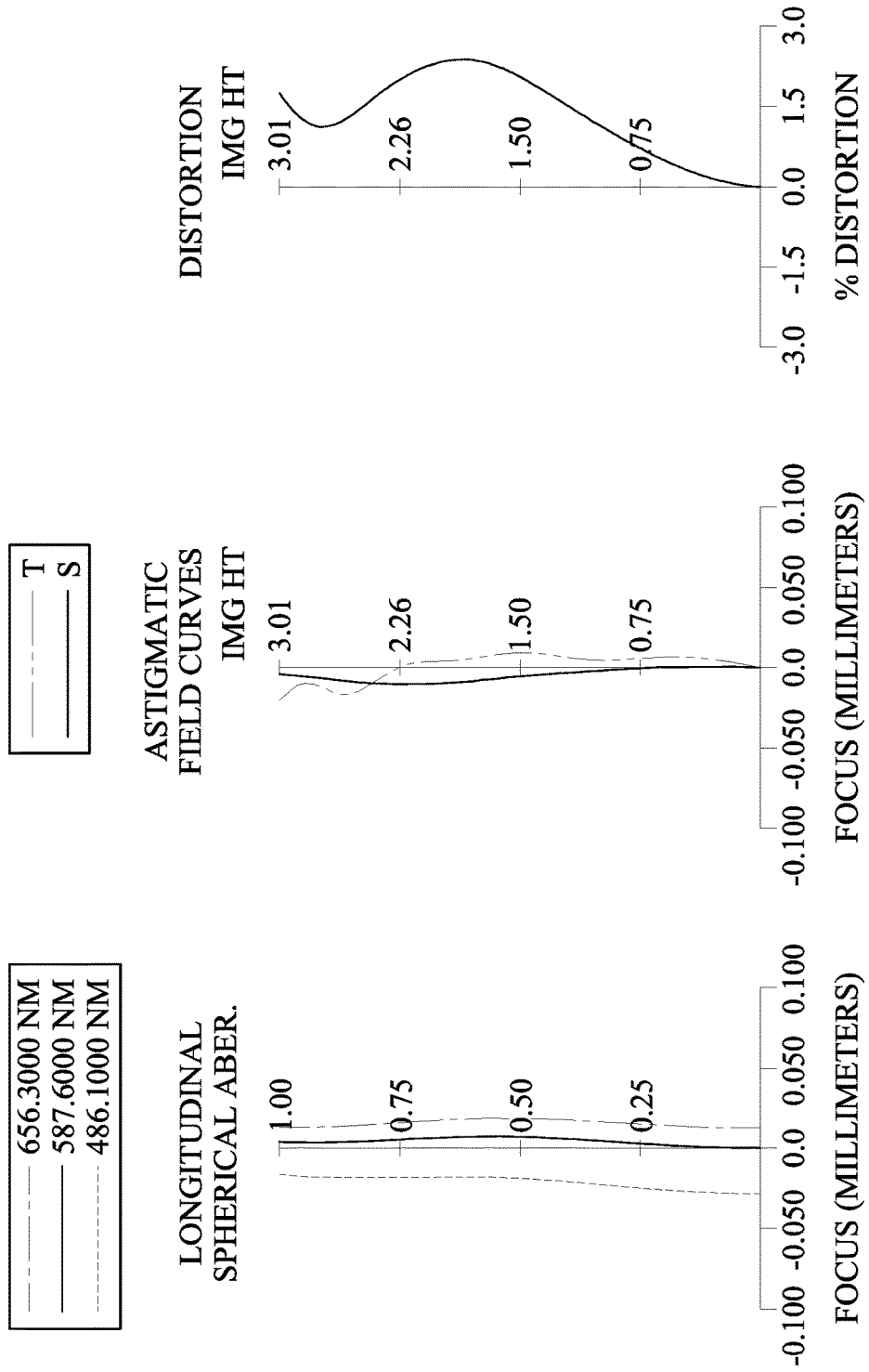
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 390. The optical imaging lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the optical imaging lens assembly has a total of six lens elements (310-360).

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. Both the object-side surface 311 and the image-side surface 312 of the first lens element 310 have at least one inflection point.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. Both the object-side surface 331 and the image-side surface 332 of the third lens element 330 have at least one inflection point.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one inflection point.

In this embodiment, as shown in Table 5, the first lens element 310, the third lens element 330, the fifth lens element 350 and the sixth lens element 360 all have an Abbe number less than 30.

The IR-cut filter 370 is made of glass material and located between the sixth lens element 360 and the image surface 380, and will not affect the focal length of the optical imaging lens assembly. The image sensor 390 is disposed on or near the image surface 380 of the optical imaging lens assembly.

The detailed optical data of the 3rd embodiment are shown in Table 5 and the aspheric surface data are shown in Table 6 below.

TABLE 5

3rd Embodiment
f = 3.53 mm, Fno = 2.25, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.053 | | | | |
| 2 | Lens 1 | 3.129 | (ASP) | 0.238 | Plastic | 1.640 | 23.3 | −14.35 |
| 3 | | 2.264 | (ASP) | 0.125 | | | | |
| 4 | Lens 2 | 1.805 | (ASP) | 0.705 | Plastic | 1.544 | 55.9 | 4.30 |
| 5 | | 6.787 | (ASP) | 0.146 | | | | |
| 6 | Lens 3 | 2.081 | (ASP) | 0.290 | Plastic | 1.640 | 23.3 | 33.60 |
| 7 | | 2.179 | (ASP) | 0.451 | | | | |
| 8 | Lens 4 | −27.987 | (ASP) | 0.568 | Plastic | 1.544 | 55.9 | 6.28 |
| 9 | | −3.066 | (ASP) | 0.259 | | | | |
| 10 | Lens 5 | −1.492 | (ASP) | 0.316 | Plastic | 1.640 | 23.3 | 5.93 |
| 11 | | −1.159 | (ASP) | 0.040 | | | | |
| 12 | Lens 6 | 2.782 | (ASP) | 0.748 | Plastic | 1.640 | 23.3 | −3.29 |
| 13 | | 1.072 | (ASP) | 0.650 | | | | |
| 14 | IR-cut filter | Plano | | 0.195 | Glass | 1.517 | 64.2 | — |
| 15 | | Plano | | 0.345 | | | | |
| 16 | Image | Plano | | — | | | | |

Note:
Reference wavelength is 587.6 nm (d-line).

TABLE 6

Aspheric Coefficients

| Surface # | | | | | |
|---|---|---|---|---|---|
| 2 | 3 | 4 | 5 | 6 | 7 |

| | 2 | 3 | 4 | 5 | 6 | 7 |
|---|---|---|---|---|---|---|
| k = | −1.5480E+01 | −9.4969E+00 | −2.8990E+00 | 9.0100E+00 | −1.7427E+00 | −2.6450E+00 |
| A4 = | −5.0300E−02 | −1.0061E−01 | −1.7168E−02 | −1.1655E−01 | −1.9213E−01 | −7.0445E−02 |
| A6 = | −1.0664E−02 | 3.5244E−03 | 1.9073E−02 | 6.6317E−02 | −7.4640E−03 | −6.8169E−02 |
| A8 = | 1.0128E−02 | 9.7609E−03 | −1.7038E−02 | −7.7285E−02 | −5.0345E−02 | 2.0998E−02 |
| A10 = | −7.5543E−03 | 6.2840E−03 | 1.4427E−02 | 2.2709E−02 | 3.8501E−02 | 3.4910E−02 |
| A12 = | 6.1979E−03 | −1.9770E−03 | −5.3951E−03 | 3.1787E−03 | −4.8364E−03 | −2.8607E−02 |
| A14 = | — | — | −3.2800E−04 | −1.9156E−03 | 9.2297E−04 | 6.6281E−03 |

| Surface # | | | | | |
|---|---|---|---|---|---|
| 8 | 9 | 10 | 11 | 12 | 13 |

| | 8 | 9 | 10 | 11 | 12 | 13 |
|---|---|---|---|---|---|---|
| k = | 2.0000E+01 | 3.1416E+00 | −6.6777E+00 | −3.5182E+00 | −3.8370E−01 | −4.7563E+00 |
| A4 = | −4.7656E−03 | −1.7986E−02 | −1.0652E−02 | −3.7861E−02 | −2.5169E−01 | −9.1828E−02 |
| A6 = | −2.4795E−02 | −1.4637E−02 | 6.9173E−03 | 8.4338E−02 | 1.3042E−01 | 4.6708E−02 |
| A8 = | 2.5734E−02 | 1.8902E−02 | 3.4924E−02 | −4.7919E−02 | −7.0343E−02 | −1.8997E−02 |
| A10 = | −2.3743E−02 | −1.6441E−02 | −4.9071E−02 | 2.0812E−02 | 2.7450E−02 | 5.1207E−03 |
| A12 = | 1.4780E−03 | 3.3798E−03 | 2.5560E−02 | −5.6914E−03 | −5.7757E−03 | −8.6149E−04 |
| A14 = | 6.5680E−03 | 1.9112E−03 | −5.3466E−03 | 5.9821E−04 | 6.3670E−04 | 8.0608E−05 |
| A16 = | −1.7132E−03 | — | 1.3890E−04 | −2.5852E−06 | −3.7742E−05 | −3.1647E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.53 | (R11 + R12)/(R11 − R12) | 2.25 |
| Fno | 2.25 | R10/R11 | −0.42 |
| HFOV [deg.] | 39.9 | f2/f3 | 0.13 |
| (T12 + T23)/CT1 | 1.14 | f4/f1 | −0.44 |
| T34/(T23 + T45) | 1.11 | f6/f5 | −0.55 |
| T12/f | 0.04 | f6/f1 | 0.23 |
| CTmax/ATmax | 1.66 | Y11/Y62 | 0.32 |
| ATmax/CTmin | 1.89 | SD/TD | 0.99 |
| ATmax/ImgH | 0.15 | TD/Yc62 | 2.45 |
| (R1 − R2)/(R1 + R2) | 0.16 | TL/f | 1.44 |
| (R7 + R8)/(R7 − R8) | 1.25 | tan(HFOV) | 0.84 |

4th Embodiment

Figure 7:
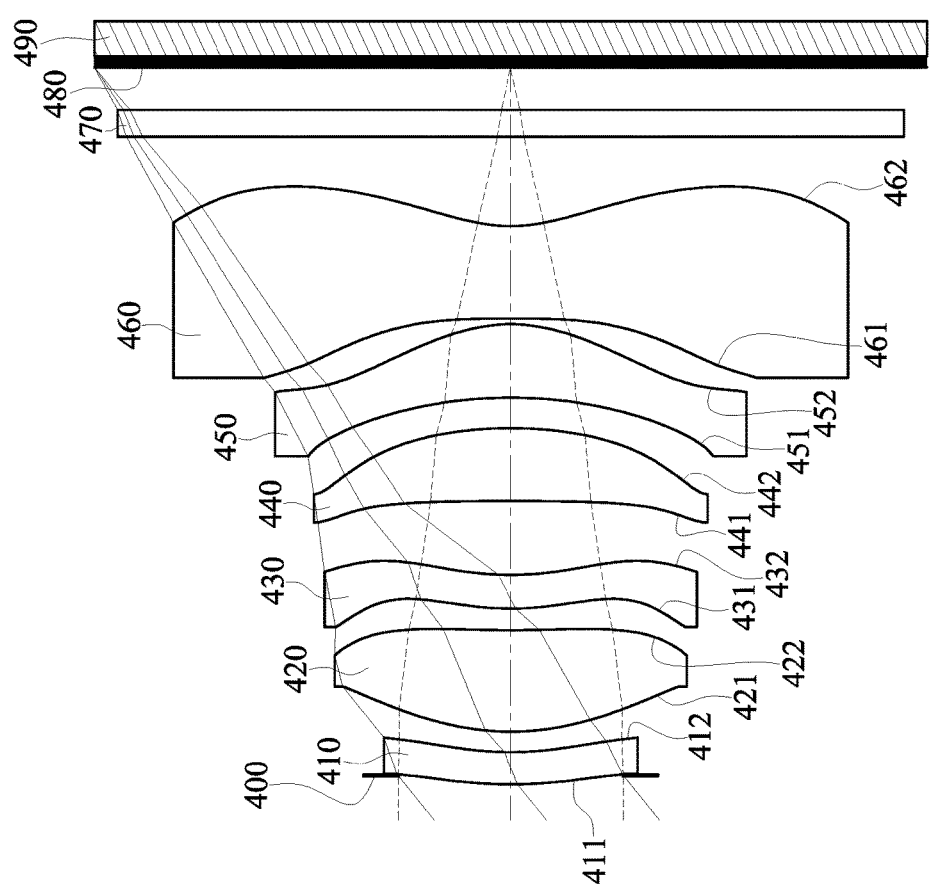
FIG. 7 is a schematic view of an image capturing unit according to the 4th embodiment of the present disclosure.
Figure 8:
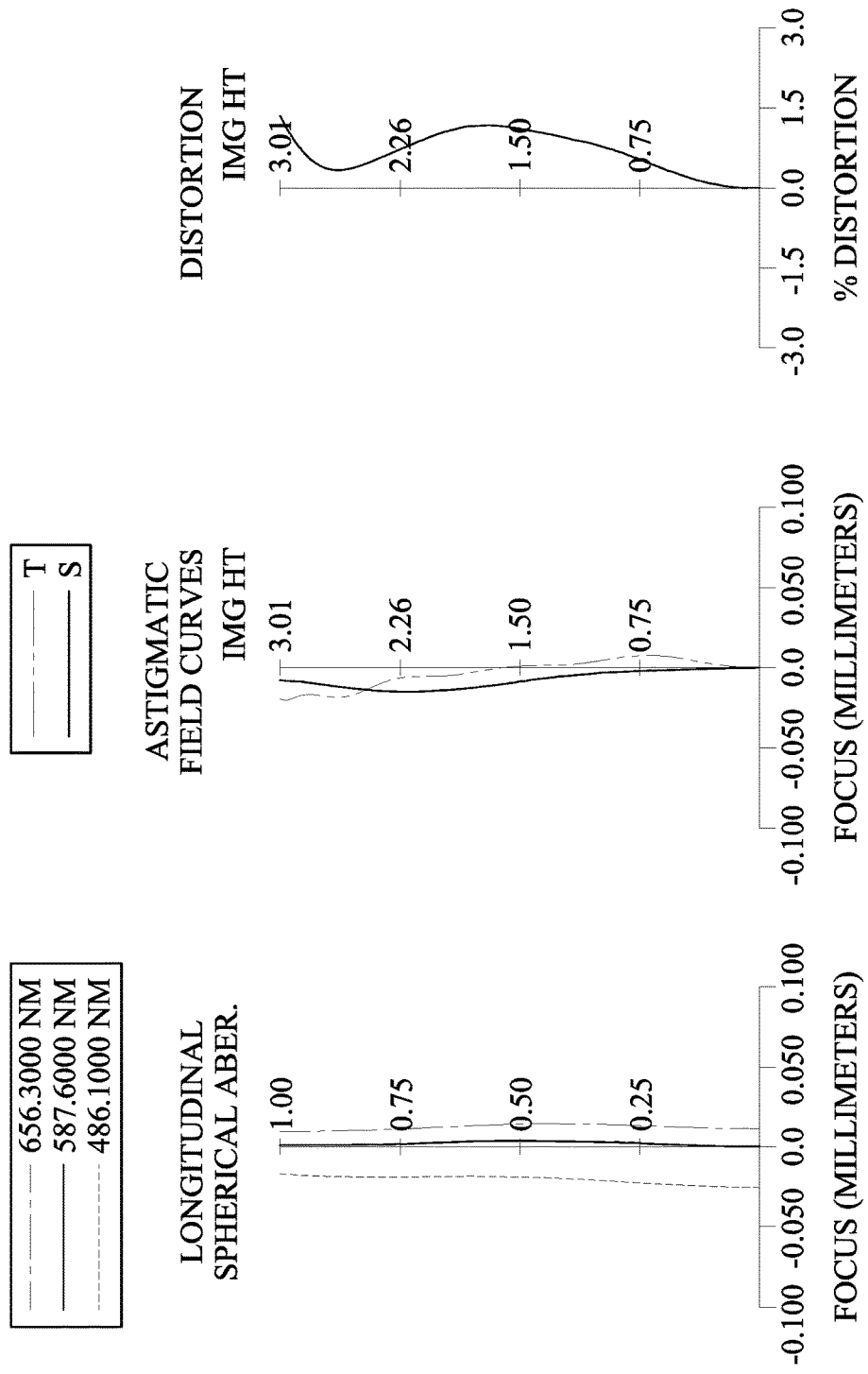
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 490. The optical imaging lens assembly includes, in order from an object side to an image side, an aperture stop 400, a first lens element 410, a second lens element 420, a third lens element 430, a fourth lens element 440, a fifth lens element 450, a sixth lens element 460, a IR-cut filter 470 and an image surface 480, wherein the optical imaging lens assembly has a total of six lens elements (410-460).

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. Both the object-side surface 411 and the image-side surface 412 of the first lens element 410 have at least one inflection point.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. Both the object-side surface 431 and the image-side surface 432 of the third lens element 430 have at least one inflection point.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one inflection point.

In this embodiment, as shown in Table 7, the first lens element 410, the third lens element 430, the fifth lens element 450 and the sixth lens element 460 all have an Abbe number less than 30.

The IR-cut filter 470 is made of glass material and located between the sixth lens element 460 and the image surface 480, and will not affect the focal length of the optical imaging lens assembly. The image sensor 490 is disposed on or near the image surface 480 of the optical imaging lens assembly.

The detailed optical data of the 4th embodiment are shown in Table 7 and the aspheric surface data are shown in Table 8 below.

TABLE 7

4th Embodiment
f = 3.67 mm, Fno = 2.25, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.065 | | | | |
| 2 | Lens 1 | 2.991 | (ASP) | 0.237 | Plastic | 1.640 | 23.3 | −14.61 |
| 3 | | 2.196 | (ASP) | 0.148 | | | | |
| 4 | Lens 2 | 1.851 | (ASP) | 0.734 | Plastic | 1.544 | 55.9 | 4.16 |
| 5 | | 8.750 | (ASP) | 0.156 | | | | |
| 6 | Lens 3 | 2.009 | (ASP) | 0.243 | Plastic | 1.640 | 23.3 | 34.96 |
| 7 | | 2.103 | (ASP) | 0.535 | | | | |
| 8 | Lens 4 | −21.681 | (ASP) | 0.531 | Plastic | 1.544 | 55.9 | 6.30 |
| 9 | | −2.984 | (ASP) | 0.221 | | | | |
| 10 | Lens 5 | −3.244 | (ASP) | 0.531 | Plastic | 1.640 | 23.3 | 2.54 |

TABLE 7-continued

4th Embodiment
f = 3.67 mm, Fno = 2.25, HFOV = 38.9 deg.

| Surface # | | Curvature Radius | | Thickness | Material | Index | Abbe # | Focal Length |
|---|---|---|---|---|---|---|---|---|
| 11 | | −1.151 | (ASP) | 0.040 | | | | |
| 12 | Lens 6 | −23.523 | (ASP) | 0.668 | Plastic | 1.640 | 23.3 | −1.62 |
| 13 | | 1.093 | (ASP) | 0.650 | | | | |
| 14 | IR-cut filter | Plano | | 0.195 | Glass | 1.517 | 64.2 | — |
| 15 | | Plano | | 0.307 | | | | |
| 16 | Image | Plano | | — | | | | |

Note:
Reference wavelength is 587.6 nm (d-line).

TABLE 8

Aspheric Coefficients

| | Surface # | | | | | |
|---|---|---|---|---|---|---|
| | 2 | 3 | 4 | 5 | 6 | 7 |
| k = | −1.5571E+01 | −8.8676E+00 | −2.1774E+00 | 1.6856E+01 | −1.6304E+00 | −2.6800E+00 |
| A4 = | −3.2894E−02 | −7.0871E−02 | −1.8274E−02 | −1.1359E−01 | −1.9574E−01 | −8.4041E−02 |
| A6 = | −1.2159E−02 | −2.4757E−03 | 1.4458E−02 | 7.0108E−02 | −1.2947E−02 | −7.3574E−02 |
| A8 = | −3.5751E−03 | −2.6541E−03 | −1.6300E−02 | −8.1089E−02 | −4.6044E−02 | 2.2372E−02 |
| A10 = | 2.0298E−02 | 2.9736E−02 | 1.4206E−02 | 2.5426E−02 | 4.1365E−02 | 3.7107E−02 |
| A12 = | −9.8714E−03 | −1.4663E−02 | −4.9917E−03 | 4.6948E−03 | −4.9885E−03 | −2.7640E−02 |
| A14 = | — | — | −6.0811E−04 | −3.2431E−03 | −1.8372E−04 | 5.8100E−03 |

| | Surface # | | | | | |
|---|---|---|---|---|---|---|
| | 8 | 9 | 10 | 11 | 12 | 13 |
| k = | −1.8516E+00 | 2.9239E+00 | −1.7332E+01 | −4.4222E+00 | −3.0000E+01 | −6.0290E+00 |
| A4 = | −1.6245E−03 | −6.8169E−03 | −5.7791E−02 | −7.7226E−02 | −1.8128E−01 | −9.3410E−02 |
| A6 = | −2.3105E−02 | −2.1858E−02 | 8.2516E−03 | 9.0074E−02 | 1.2762E−01 | 5.1871E−02 |
| A8 = | 2.1309E−02 | 1.8809E−02 | 3.6085E−02 | −4.7181E−02 | −7.0908E−02 | −2.1111E−02 |
| A10 = | −2.4479E−02 | −1.5772E−02 | −4.9758E−02 | 2.0950E−02 | 2.7429E−02 | 5.4852E−03 |
| A12 = | 1.7141E−02 | 3.2684E−03 | 2.6013E−02 | −5.6450E−03 | −5.8259E−03 | −8.7507E−04 |
| A14 = | 6.6992E−03 | 1.6578E−03 | −5.0350E−03 | 6.0496E−04 | 6.4066E−04 | 7.7285E−05 |
| A16 = | −1.7339E−03 | — | −2.2847E−05 | −8.1459E−06 | −3.6862E−05 | −2.8685E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.67 | (R11 + R12)/(R11 − R12) | 0.91 |
| Fno | 2.25 | R10/R11 | 0.05 |
| HFOV [deg.] | 38.9 | f2/f3 | 0.12 |
| (T12 + T23)/CT1 | 1.28 | f4/f1 | −0.43 |
| T34/(T23 + T45) | 1.42 | f6/f5 | −0.64 |
| T12/f | 0.04 | f6/f1 | 0.11 |
| CTmax/ATmax | 1.37 | Y11/Y62 | 0.34 |
| ATmax/CTmin | 2.26 | SD/TD | 0.98 |
| ATmax/ImgH | 0.18 | TD/Yc62 | 2.58 |
| (R1 − R2)/(R1 + R2) | 0.15 | TL/f | 1.42 |
| (R7 + R8)/(R7 − R8) | 1.32 | tan(HFOV) | 0.81 |

5th Embodiment

Figure 9:
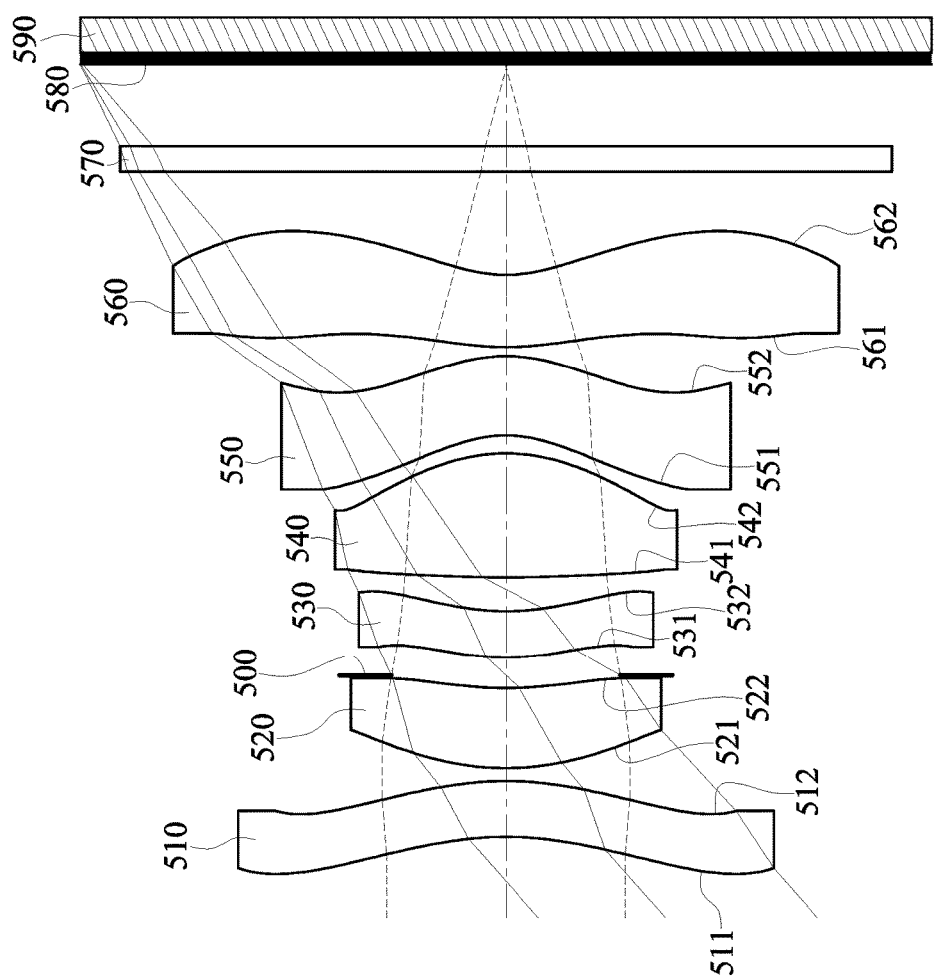
FIG. 9 is a schematic view of an image capturing unit according to the 5th embodiment of the present disclosure.
Figure 10:
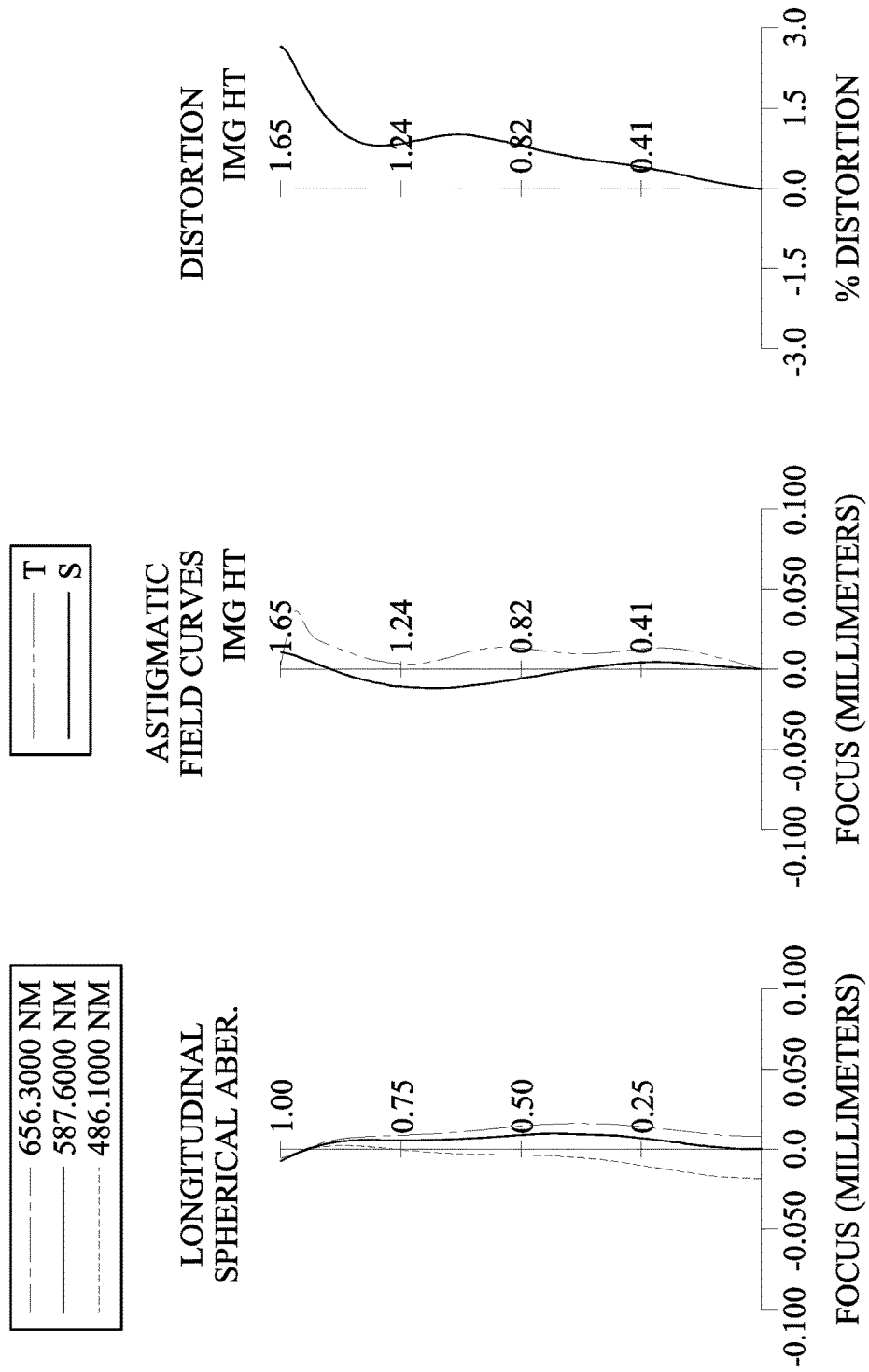
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 590. The optical imaging lens assembly includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image surface 580, wherein the optical imaging lens assembly has a total of six lens elements (510-560).

The first lens element 510 with positive refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric. Both the object-side surface 511 and the image-side surface 512 of the first lens element 510 have at least one inflection point.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. Both the object-side surface 531 and the image-side surface 532 of the third lens element 530 have at least one inflection point.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one inflection point.

In this embodiment, as shown in Table 9, both the third lens element 530 and the fifth lens element 550 have an Abbe number less than 30.

The IR-cut filter 570 is made of glass material and located between the sixth lens element 560 and the image surface 580, and will not affect the focal length of the optical imaging lens assembly. The image sensor 590 is disposed on or near the image surface 580 of the optical imaging lens assembly.

The detailed optical data of the 5th embodiment are shown in Table 9 and the aspheric surface data are shown in Table 10 below.

TABLE 9

5th Embodiment
f = 1.81 mm, Fno = 1.95, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.274 | (ASP) | 0.216 | Plastic | 1.544 | 55.9 | 37.46 |
| 2 | | −1.271 | (ASP) | 0.050 | | | | |
| 3 | Lens 2 | 1.038 | (ASP) | 0.311 | Plastic | 1.544 | 55.9 | 6.02 |
| 4 | | 1.358 | (ASP) | 0.050 | | | | |
| 5 | Ape. Stop | Plano | | 0.070 | | | | |
| 6 | Lens 3 | 1.058 | (ASP) | 0.180 | Plastic | 1.640 | 23.3 | 73.54 |
| 7 | | 1.011 | (ASP) | 0.131 | | | | |
| 8 | Lens 4 | 5.265 | (ASP) | 0.481 | Plastic | 1.544 | 55.9 | 1.16 |
| 9 | | −0.695 | (ASP) | 0.070 | | | | |
| 10 | Lens 5 | −0.492 | (ASP) | 0.309 | Plastic | 1.640 | 23.3 | 26.80 |
| 11 | | −0.595 | (ASP) | 0.035 | | | | |
| 12 | Lens 6 | 1.144 | (ASP) | 0.280 | Plastic | 1.544 | 55.9 | −2.06 |
| 13 | | 0.518 | (ASP) | 0.400 | | | | |
| 14 | IR-cut filter | Plano | | 0.100 | Glass | 1.517 | 64.2 | — |
| 15 | | Plano | | 0.319 | | | | |
| 16 | Image | Plano | | — | | | | |

Note:
Reference wavelength is 587.6 nm (d-line).

TABLE 10

Aspheric Coefficients

| Surface # | 1 | 2 | 3 | 4 | 6 | 7 |
|---|---|---|---|---|---|---|
| k = | −8.6219E+00 | −8.3896E+00 | −1.0179E+00 | 3.0638E−01 | 7.2036E−01 | −1.1247E+00 |
| A4 = | 3.8889E−02 | 1.8487E−02 | −2.1973E−01 | −1.0530E+00 | −1.0918E+00 | −3.9996E−01 |
| A6 = | 1.8407E−02 | 1.0400E−01 | 7.5934E−01 | 4.8112E−01 | −1.4842E+00 | −2.0627E+00 |
| A8 = | 6.0851E−02 | −2.3913E−02 | −4.9097E+00 | −2.5393E−01 | −4.7024E+00 | 1.8743E+00 |
| A10 = | −1.8760E−02 | 8.9207E−02 | 1.4777E+01 | −5.0623E−01 | 2.5291E+01 | 1.2519E+01 |
| A12 = | — | — | −1.7318E+01 | 2.9815E+00 | −2.8001E+01 | −4.5312E+01 |
| A14 = | — | — | −1.4193E+00 | −1.0239E+01 | −1.7379E+01 | 3.5032E+01 |

| Surface # | 8 | 9 | 10 | 11 | 12 | 13 |
|---|---|---|---|---|---|---|
| k = | 2.0000E+01 | −1.1484E+00 | −3.0783E+00 | −4.7674E+00 | −4.4243E−01 | −5.6966E+00 |
| A4 = | −8.6736E−02 | 3.1551E−01 | 4.8360E−01 | 8.9446E−02 | −1.6290E+00 | −5.7132E−01 |
| A6 = | −6.5268E−01 | −5.2083E−01 | −1.6986E−01 | 1.8429E+00 | 3.9197E+00 | 1.1617E+00 |

TABLE 10-continued

Aspheric Coefficients

| A8 = | 4.4745E+00 | 2.2735E+00 | 3.3415E+00 | −5.1174E+00 | −7.9753E+00 | −1.9172E+00 |
|---|---|---|---|---|---|---|
| A10 = | −9.7976E+00 | −6.4721E+00 | −1.9339E+01 | 8.7798E+00 | 1.0977E+01 | 2.0254E+00 |
| A12 = | −2.7318E−01 | 6.4910E+00 | 3.9520E+01 | −8.6462E+00 | −8.9203E+00 | −1.3215E+00 |
| A14 = | 3.9109E+01 | 1.3672E+01 | −3.3541E+01 | 3.5140E+00 | 3.8588E+00 | 4.8769E−01 |
| A16 = | −4.4634E+01 | — | 9.8343E+00 | −1.4090E−01 | −6.8905E−01 | −7.7288E−02 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.81 | (R11 + R12)/(R11 − R12) | 2.65 |
| Fno | 1.95 | R10/R11 | −0.52 |
| HFOV [deg.] | 41.6 | f2/f3 | 0.08 |
| (T12 + T23)/CT1 | 0.79 | f4/f1 | 0.03 |
| T34/(T23 + T45) | 0.69 | f6/f5 | −0.08 |
| T12/f | 0.03 | f6/f1 | −0.06 |
| CTmax/ATmax | 3.67 | Y11/Y62 | 0.80 |
| ATmax/CTmin | 0.73 | SD/TD | 0.71 |
| ATmax/ImgH | 0.08 | TD/Yc62 | 2.65 |
| (R1 − R2)/(R1 + R2) | 0.001 | TL/f | 1.66 |
| (R7 + R8)/(R7 − R8) | 0.77 | tan(HFOV) | 0.89 |

6th Embodiment

Figure 11:
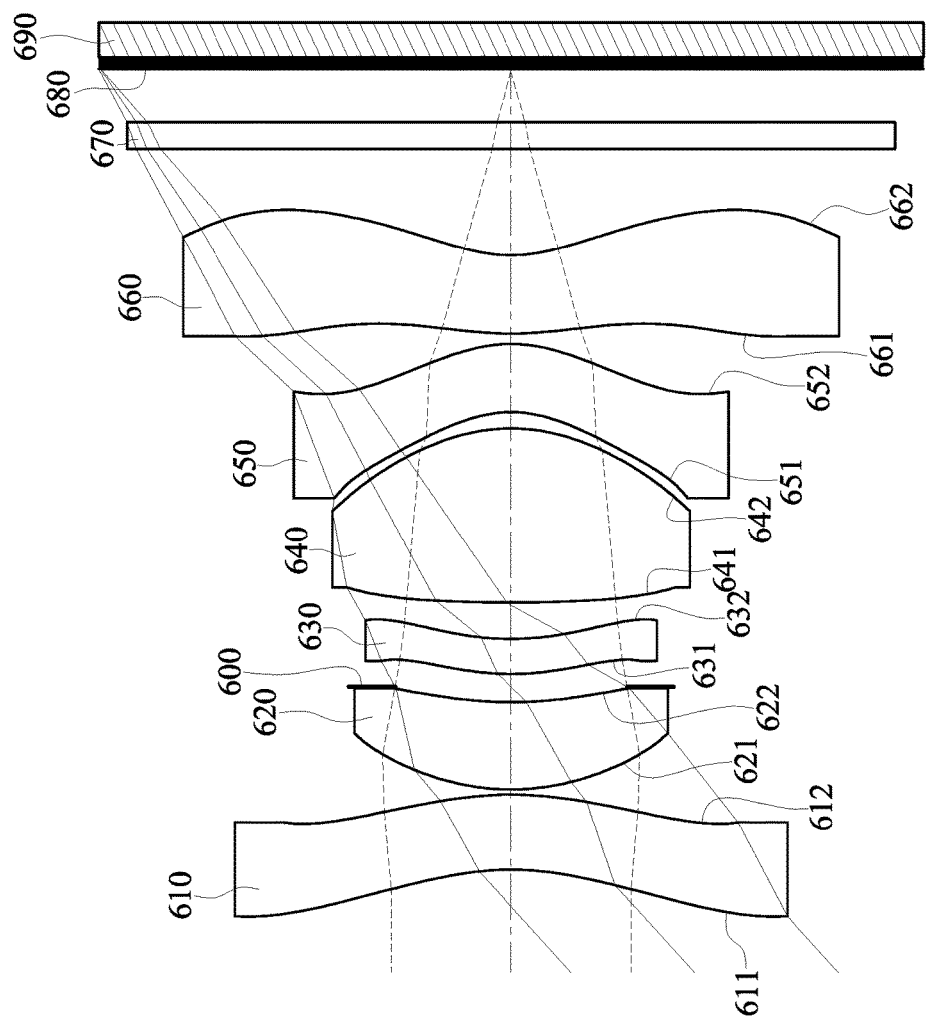
FIG. 11 is a schematic view of an image capturing unit according to the 6th embodiment of the present disclosure.
Figure 12:
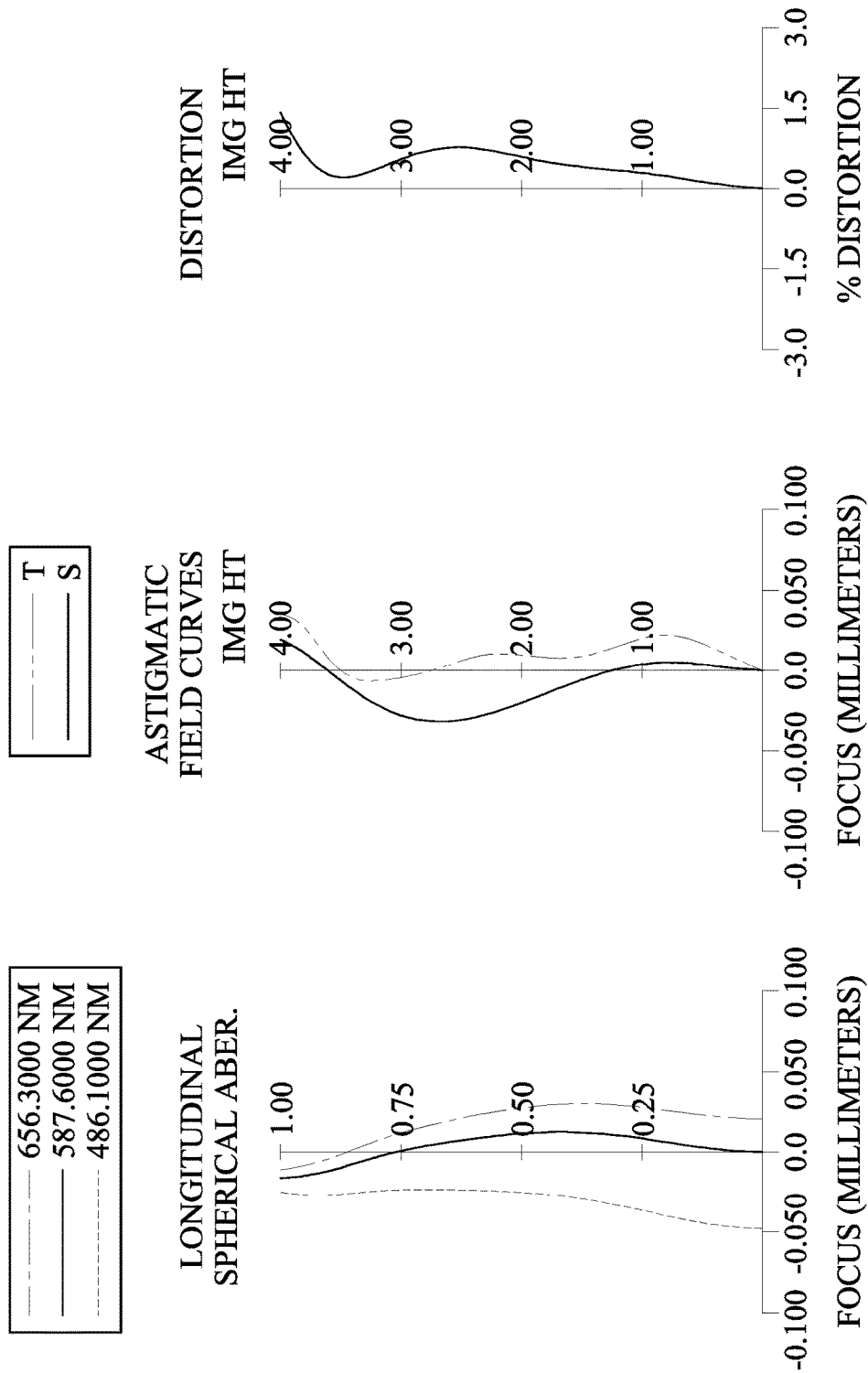
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 690. The optical imaging lens assembly includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680, wherein the optical imaging lens assembly has a total of six lens elements (610-660).

The first lens element 610 with negative refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric. Both the object-side surface 611 and the image-side surface 612 of the first lens element 610 have at least one inflection point.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. Both the object-side surface 631 and the image-side surface 632 of the third lens element 630 have at least one inflection point.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one inflection point.

In this embodiment, as shown in Table 11, both the third lens element 630 and the fifth lens element 650 have an Abbe number less than 30.

The IR-cut filter 670 is made of glass material and located between the sixth lens element 660 and the image surface 680, and will not affect the focal length of the optical imaging lens assembly. The image sensor 690 is disposed on or near the image surface 680 of the optical imaging lens assembly.

The detailed optical data of the 6th embodiment are shown in Table 11 and the aspheric surface data are shown in Table 12 below.

TABLE 11

6th Embodiment
f = 4.32 mm, Fno = 1.85, HFOV = 42.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.756 | (ASP) | 0.735 | Plastic | 1.544 | 55.9 | −37.80 |
| 2 | | −3.482 | (ASP) | 0.050 | | | | |
| 3 | Lens 2 | 2.268 | (ASP) | 0.849 | Plastic | 1.544 | 55.9 | 9.21 |
| 4 | | 3.596 | (ASP) | 0.150 | | | | |
| 5 | Ape. Stop | Plano | | 0.126 | | | | |
| 6 | Lens 3 | 2.657 | (ASP) | 0.341 | Plastic | 1.640 | 23.3 | 60.00 |
| 7 | | 2.711 | (ASP) | 0.354 | | | | |
| 8 | Lens 4 | 14.568 | (ASP) | 1.700 | Plastic | 1.544 | 55.9 | 3.05 |
| 9 | | −1.796 | (ASP) | 0.159 | | | | |
| 10 | Lens 5 | −1.177 | (ASP) | 0.663 | Plastic | 1.640 | 23.3 | 68.64 |
| 11 | | −1.398 | (ASP) | 0.101 | | | | |
| 12 | Lens 6 | 3.291 | (ASP) | 0.764 | Plastic | 1.544 | 55.9 | −4.99 |
| 13 | | 1.367 | (ASP) | 1.038 | | | | |
| 14 | IR-cut filter | Plano | | 0.260 | Glass | 1.517 | 64.2 | — |
| 15 | | Plano | | 0.520 | | | | |
| 16 | Image | Plano | | — | | | | |

Note:
Reference wavelength is 587.6 nm (d-line).

TABLE 12

Aspheric Coefficients

| Surface # | 1 | 2 | 3 | 4 | 6 | 7 |
|---|---|---|---|---|---|---|
| k = | −8.4350E+00 | −9.9373E+00 | −1.0439E+00 | 2.4694E+00 | 1.1034E+00 | −8.8783E−01 |
| A4 = | 2.6014E−03 | 3.0207E−02 | −1.2140E−02 | −5.0622E−02 | −5.7027E−02 | −2.1576E−02 |
| A6 = | 1.5997E−04 | 7.5623E−04 | 9.9966E−03 | 1.2232E−02 | −1.2972E−02 | −1.5103E−02 |
| A8 = | 2.3393E−05 | −4.5192E−05 | −4.2800E−03 | −2.2076E−03 | −6.0495E−03 | 4.8299E−04 |
| A10 = | −1.6059E−06 | 1.4852E−05 | 2.2906E−03 | −7.7304E−04 | 3.9027E−03 | 1.9546E−03 |
| A12 = | — | — | −6.1767E−04 | 8.5843E−04 | −1.2903E−03 | −1.1333E−03 |
| A14 = | — | — | 1.1997E−04 | −1.4849E−04 | −1.3786E−04 | 1.5057E−04 |

| Surface # | 8 | 9 | 10 | 11 | 12 | 13 |
|---|---|---|---|---|---|---|
| k = | 1.9184E+01 | −9.2266E−01 | −2.5620E+00 | −3.7351E+00 | −5.2601E−01 | −5.7235E+00 |
| A4 = | 1.7779E−04 | 1.3146E−02 | 1.4105E−02 | −3.7962E−04 | −9.3894E−02 | −3.2410E−02 |
| A6 = | −5.0915E−04 | −3.0804E−03 | −1.6859E−03 | 1.6215E−02 | 3.3553E−02 | 9.8838E−03 |
| A8 = | 5.3045E−03 | 2.6091E−03 | 4.2203E−03 | −6.3814E−03 | −1.0063E−02 | −2.4047E−03 |
| A10 = | −1.9931E−03 | −1.4050E−03 | −3.7290E−03 | 1.6443E−03 | 2.0568E−03 | 3.7709E−04 |
| A12 = | −5.9223E−05 | 1.0724E−04 | 1.0530E−03 | −2.4268E−04 | −2.4813E−04 | −3.6813E−05 |
| A14 = | 1.3258E−04 | 3.3346E−05 | −1.5201E−04 | 1.4219E−05 | 1.5958E−05 | 2.0219E−06 |
| A16 = | −1.4315E−05 | — | 2.2596E−06 | 2.4540E−08 | −4.2568E−07 | −4.7089E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.32 | (R11 + R12)/(R11 − R12) | 2.42 |
| Fno | 1.85 | R10/R11 | −0.42 |
| HFOV [deg.] | 42.3 | f2/f3 | 0.15 |
| (T12 + T23)/CT1 | 0.44 | f4/f1 | −0.08 |
| T34/(T23 + T45) | 0.81 | f6/f5 | −0.07 |
| T12/f | 0.01 | f6/f1 | 0.13 |
| CTmax/ATmax | 4.80 | Y11/Y62 | 0.84 |
| ATmax/CTmin | 1.04 | SD/TD | 0.70 |
| ATmax/ImgH | 0.09 | TD/Yc62 | 2.76 |
| (R1 − R2)/(R1 + R2) | −0.12 | TL/f | 1.81 |
| (R7 + R8)/(R7 − R8) | 0.78 | tan(HFOV) | 0.91 |

7th Embodiment

Figure 13:
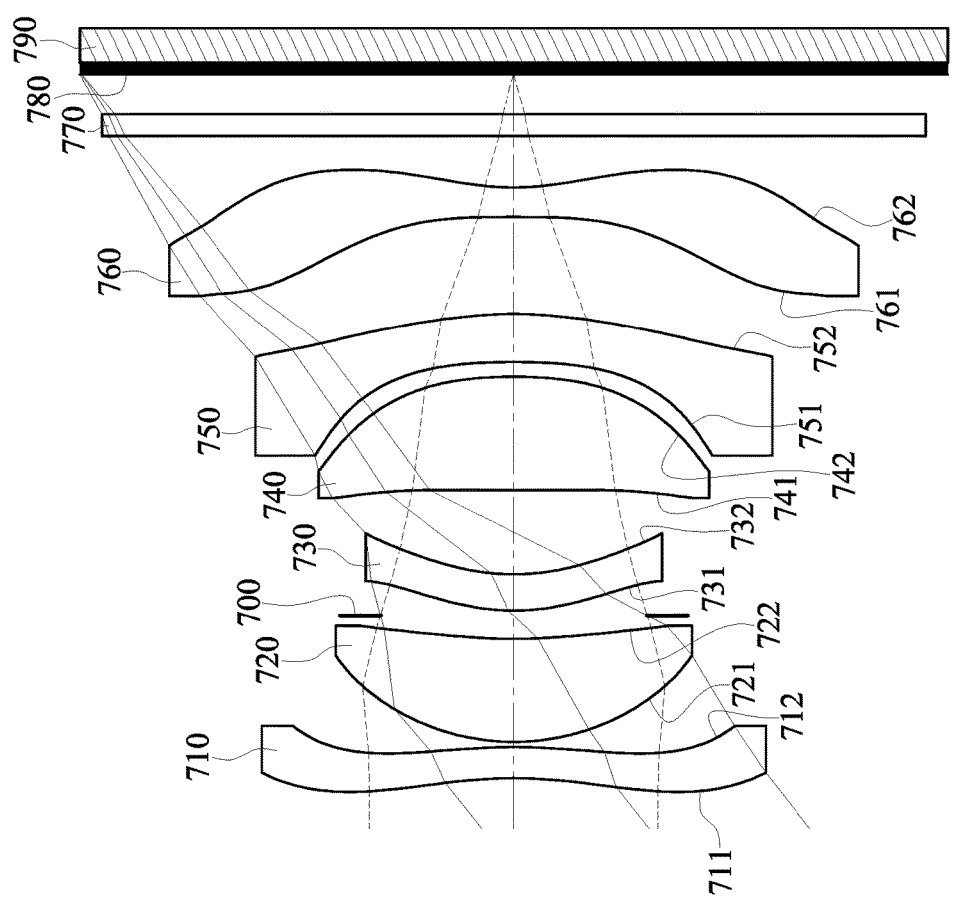
FIG. 13 is a schematic view of an image capturing unit according to the 7th embodiment of the present disclosure.
Figure 14:
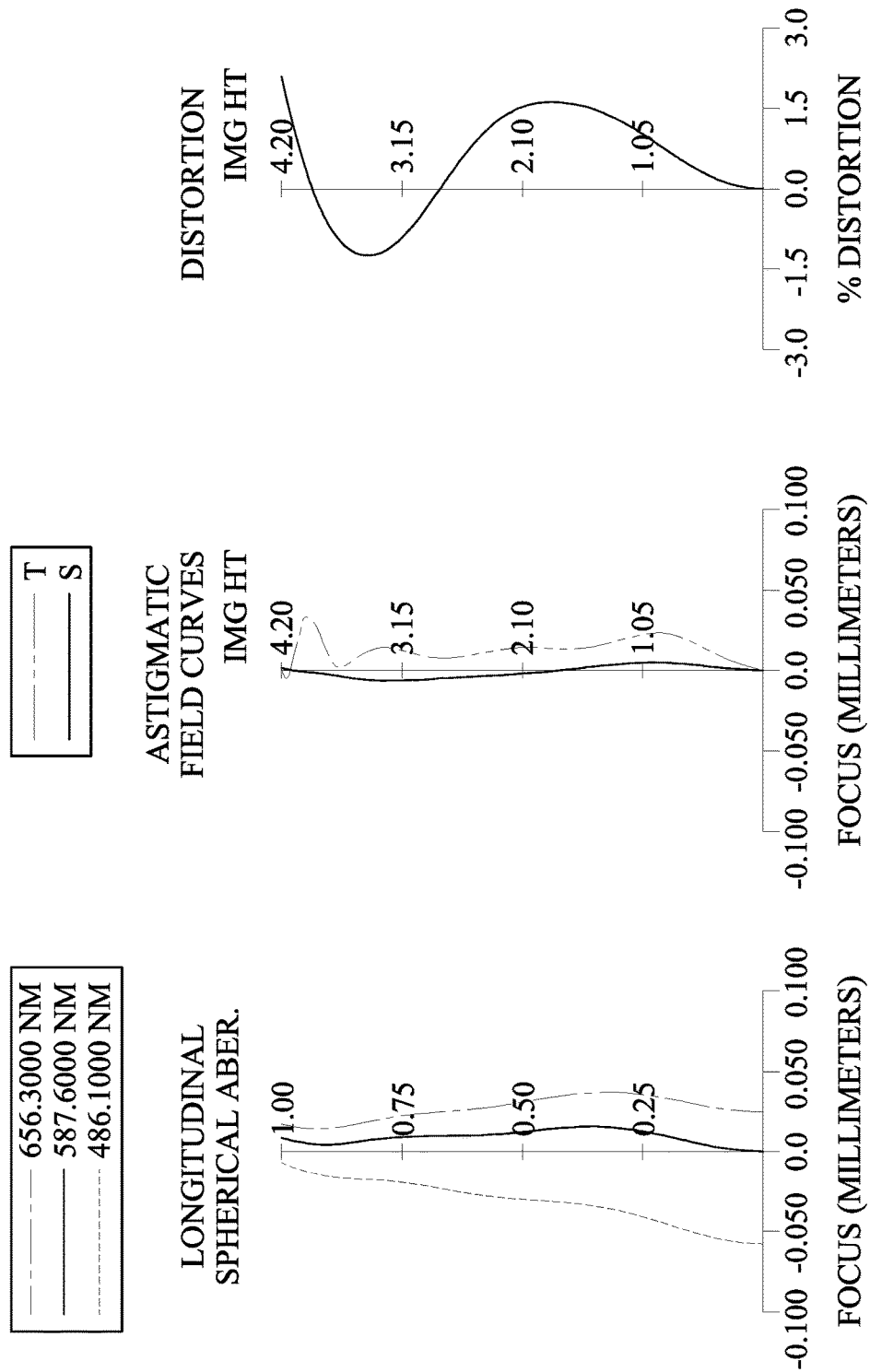
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 790.

The optical imaging lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780, wherein the optical imaging lens assembly has a total of six lens elements (710-760).

The first lens element 710 with negative refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric. Both the object-side surface 711 and the image-side surface 712 of the first lens element 710 have at least one inflection point.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has at least one inflection point.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with negative refractive power has an object-side surface 761 being concave in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one inflection point.

In this embodiment, as shown in Table 13, both the first lens element 710 and the third lens element 730 have an Abbe number less than 30.

The IR-cut filter 770 is made of glass material and located between the sixth lens element 760 and the image surface 780, and will not affect the focal length of the optical imaging lens assembly. The image sensor 790 is disposed on or near the image surface 780 of the optical imaging lens assembly.

The detailed optical data of the 7th embodiment are shown in Table 13 and the aspheric surface data are shown in Table 14 below.

TABLE 13

7th Embodiment
f = 5.19 mm, Fno = 1.85, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.251 | (ASP) | 0.302 | Plastic | 1.660 | 20.4 | −27.29 |
| 2 | | −5.722 | (ASP) | 0.050 | | | | |
| 3 | Lens 2 | 2.271 | (ASP) | 1.000 | Plastic | 1.535 | 55.8 | 6.75 |
| 4 | | 5.181 | (ASP) | 0.229 | | | | |
| 5 | Ape. Stop | Plano | | 0.050 | | | | |
| 6 | Lens 3 | 2.100 | (ASP) | 0.353 | Plastic | 1.639 | 23.3 | 28.07 |
| 7 | | 2.223 | (ASP) | 0.817 | | | | |
| 8 | Lens 4 | 94.726 | (ASP) | 1.100 | Plastic | 1.535 | 55.8 | 8.96 |
| 9 | | −5.030 | (ASP) | 0.143 | | | | |
| 10 | Lens 5 | −7.511 | (ASP) | 0.471 | Plastic | 1.583 | 30.2 | 14.71 |
| 11 | | −4.098 | (ASP) | 0.942 | | | | |
| 12 | Lens 6 | −35.494 | (ASP) | 0.287 | Plastic | 1.535 | 55.8 | −4.25 |
| 13 | | 2.436 | (ASP) | 0.500 | | | | |
| 14 | IR-cut filter | Plano | | 0.210 | Glass | 1.517 | 64.2 | — |
| 15 | | Plano | | 0.388 | | | | |
| 16 | Image | Plano | | — | | | | |

Note:
Reference wavelength is 587.6 nm (d-line).

TABLE 14

Aspheric Coefficients

| Surface # | 1 | 2 | 3 | 4 | 6 | 7 |
|---|---|---|---|---|---|---|
| k = | −1.5513E+01 | −3.0000E+01 | −4.5588E−01 | 3.1527E+00 | 1.6729E−01 | −4.9914E−01 |
| A4 = | 1.2375E−02 | 1.7168E−02 | 1.1552E−03 | −4.6057E−02 | −6.0873E−02 | −1.5810E−02 |
| A6 = | 5.4171E−04 | 8.5033E−04 | 5.0807E−03 | 1.8612E−02 | 1.9233E−03 | −1.2193E−02 |

TABLE 14-continued

| Aspheric Coefficients | | | | | |
|---|---|---|---|---|---|
| A8 = | −1.1858E−04 | −6.2570E−05 | −3.5973E−03 | −4.3537E−03 | −6.3814E−03 | 2.6843E−03 |
| A10 = | 7.8660E−06 | 1.7132E−05 | 2.3909E−03 | −7.5425E−04 | 3.0392E−03 | 2.7315E−03 |
| A12 = | — | — | −7.5805E−04 | 8.7378E−04 | −4.6462E−04 | −1.5332E−03 |
| A14 = | — | — | 1.0785E−04 | −1.6659E−04 | −1.1058E−04 | 2.9965E−04 |

| Surface # | 8 | 9 | 10 | 11 | 12 | 13 |
|---|---|---|---|---|---|---|
| k = | −3.0000E+01 | 2.1193E+00 | 4.0155E+00 | −3.0000E+01 | −3.0000E+01 | −1.0134E+01 |
| A4 = | −9.2995E−03 | −6.7503E−02 | −5.2615E−02 | −1.7555E−02 | −8.5975E−02 | −4.0992E−02 |
| A6 = | −2.7473E−03 | 1.2206E−02 | 1.4582E−03 | 1.3101E−02 | 3.4216E−02 | 1.1663E−02 |
| A8 = | 3.1623E−03 | 2.1228E−03 | 6.6661E−03 | −6.3514E−03 | −1.0057E−02 | −2.6628E−03 |
| A10 = | −1.6321E−03 | −1.5878E−03 | −4.0043E−03 | 1.7029E−03 | 2.0552E−03 | 3.8479E−04 |
| A12 = | 5.6134E−05 | 5.8249E−05 | 9.4726E−04 | −2.3307E−04 | −2.4850E−04 | −3.5795E−05 |
| A14 = | 1.4394E−04 | 3.4569E−05 | −1.4444E−04 | 1.4636E−05 | 1.5898E−05 | 2.0214E−06 |
| A16 = | −2.2524E−05 | — | 1.3814E−05 | −2.9797E−07 | −4.1736E−07 | −5.1000E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.19 | (R11 + R12)/(R11 − R12) | 0.87 |
| Fno | 1.85 | R10/R11 | 0.12 |
| HFOV [deg.] | 38.3 | f2/f3 | 0.24 |
| (T12 + T23)/CT1 | 1.09 | f4/f1 | −0.33 |
| T34/(T23 + T45) | 1.94 | f6/f5 | −0.29 |
| T12/f | 0.01 | f6/f1 | 0.16 |
| CTmax/ATmax | 1.17 | Y11/Y62 | 0.73 |
| ATmax/CTmin | 3.28 | SD/TD | 0.72 |
| ATmax/ImgH | 0.22 | TD/Yc62 | 3.68 |
| (R1 − R2)/(R1 + R2) | −0.15 | TL/f | 1.32 |
| (R7 + R8)/(R7 − R8) | 0.90 | tan(HFOV) | 0.79 |

8th Embodiment

Figure 15:
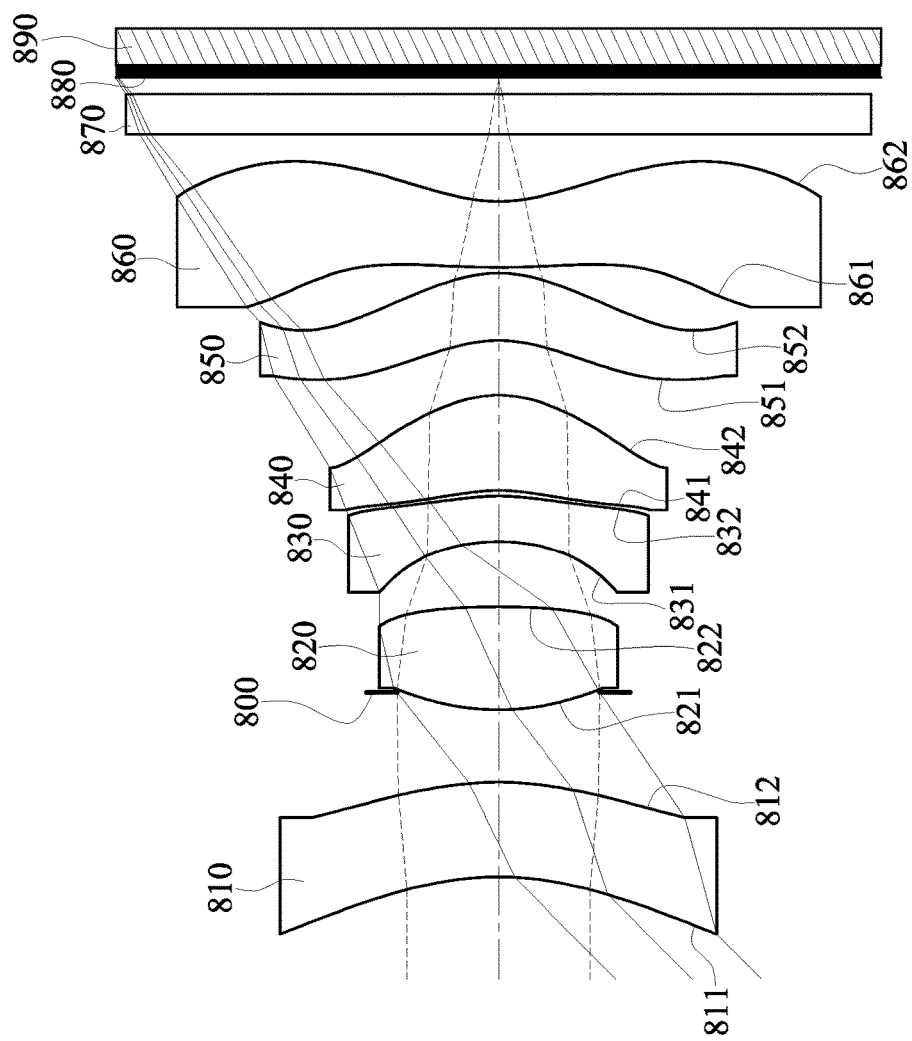
FIG. 15 is a schematic view of an image capturing unit according to the 8th embodiment of the present disclosure.
Figure 16:
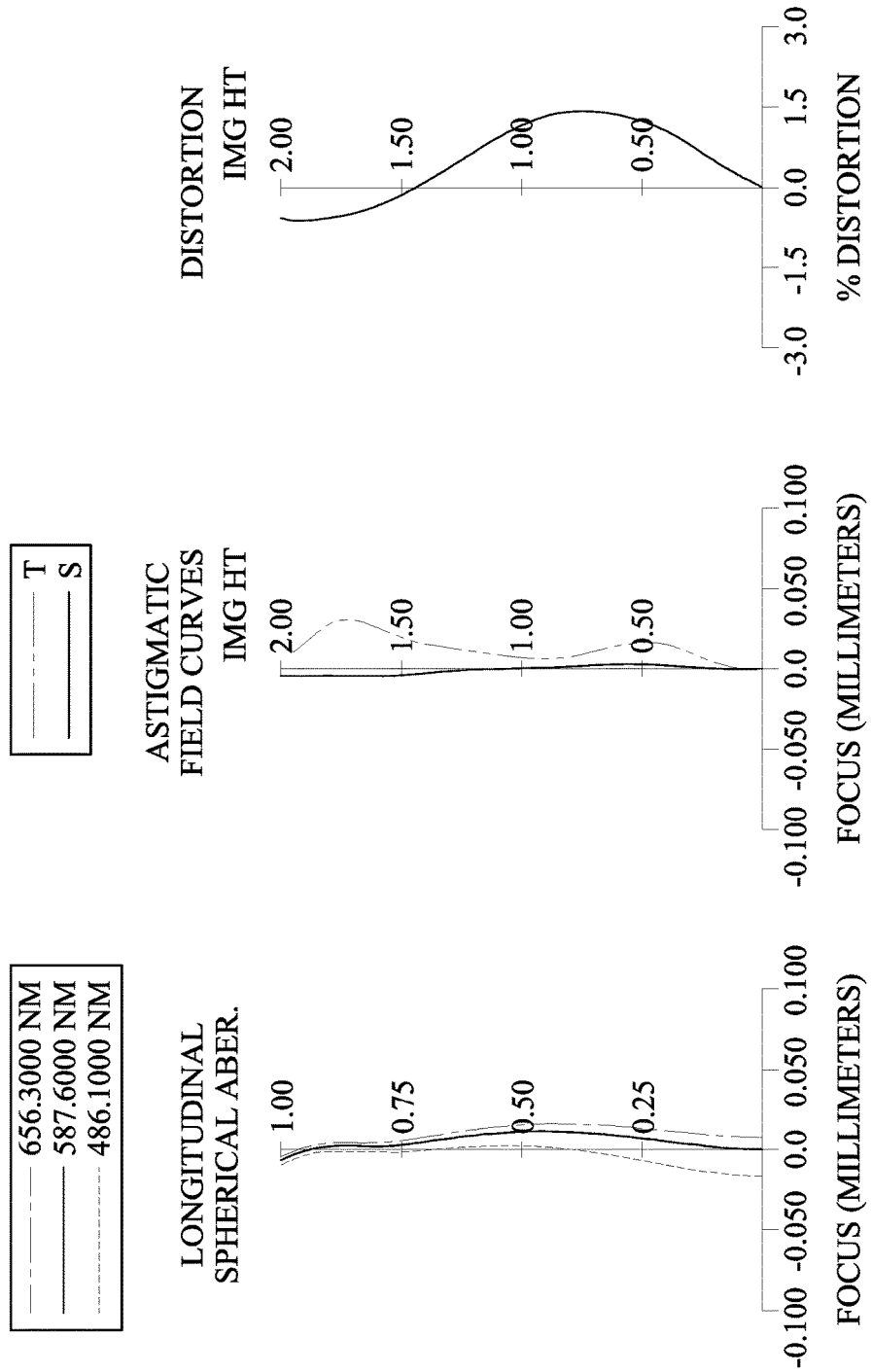
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 890. The optical imaging lens assembly includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880, wherein the optical imaging lens assembly has a total of six lens elements (810-860).

The first lens element 810 with positive refractive power has an object-side surface 811 being concave in a paraxial region thereof and an image-side surface 812 being convex in a paraxial region thereof. The first lens element 810 is made of plastic material and has the object-side surface 811 and the image-side surface 812 being both aspheric. Both the object-side surface 811 and the image-side surface 812 of the first lens element 810 have at least one inflection point.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric. The image-side surface 832 of the third lens element 830 has at least one inflection point.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one inflection point.

In this embodiment, as shown in Table 15, the third lens element 830, the fifth lens element 850 and the sixth lens element 860 all have an Abbe number less than 30.

The IR-cut filter 870 is made of glass material and located between the sixth lens element 860 and the image surface 880, and will not affect the focal length of the optical imaging lens assembly. The image sensor 890 is disposed on or near the image surface 880 of the optical imaging lens assembly.

The detailed optical data of the 8th embodiment are shown in Table 15 and the aspheric surface data are shown in Table 16 below.

TABLE 15

8th Embodiment
f = 2.02 mm, Fno = 2.10, HFOV = 44.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.687 | (ASP) | 0.500 | Plastic | 1.544 | 55.9 | 107.28 |
| 2 | | −1.810 | (ASP) | 0.472 | | | | |
| 3 | Ape. Stop | Plano | | −0.091 | | | | |
| 4 | Lens 2 | 1.371 | (ASP) | 0.538 | Plastic | 1.544 | 55.9 | 2.00 |
| 5 | | −4.549 | (ASP) | 0.344 | | | | |
| 6 | Lens 3 | −1.095 | (ASP) | 0.240 | Plastic | 1.640 | 23.3 | 19.10 |
| 7 | | −1.091 | (ASP) | 0.030 | | | | |
| 8 | Lens 4 | −0.818 | (ASP) | 0.499 | Plastic | 1.544 | 55.9 | 2.45 |
| 9 | | −0.616 | (ASP) | 0.288 | | | | |
| 10 | Lens 5 | −0.664 | (ASP) | 0.352 | Plastic | 1.640 | 23.3 | 5.75 |
| 11 | | −0.679 | (ASP) | 0.030 | | | | |
| 12 | Lens 6 | 3.788 | (ASP) | 0.350 | Plastic | 1.640 | 23.3 | −1.81 |
| 13 | | 0.856 | (ASP) | 0.350 | | | | |
| 14 | IR-cut filter | Plano | | 0.210 | Glass | 1.517 | 64.2 | — |
| 15 | | Plano | | 0.088 | | | | |
| 16 | Image | Plano | | — | | | | |

Note:
Reference wavelength is 587.6 nm (d-line).

TABLE 16

Aspheric Coefficients

| Surface # | 1 | 2 | 4 | 5 | 6 | 7 |
|---|---|---|---|---|---|---|
| k = | −2.8455E+00 | −6.4994E+00 | 5.7027E−01 | 1.0000E+00 | −2.3791E+00 | −5.0000E+01 |
| A4 = | 1.4843E−02 | 5.4886E−03 | 2.8492E−02 | −1.4255E−01 | −6.2689E−01 | −2.4133E−02 |
| A6 = | 1.1601E−03 | 5.3318E−03 | −2.0112E−01 | −6.7977E−01 | −3.8069E+00 | 4.0095E−01 |
| A8 = | 1.2216E−04 | 1.3163E−02 | 3.5205E−01 | 2.0529E+00 | −2.2083E+00 | −1.1579E+00 |
| A10 = | 9.6288E−04 | −4.1280E−03 | −2.0805E+00 | −6.8259E+00 | 8.9886E+00 | 1.4765E+00 |
| A12 = | −3.9061E−04 | −2.1335E−04 | 5.1214E−01 | 6.6490E+00 | −1.4236E+01 | −1.3777E+00 |
| A14 = | — | — | −8.4253E−01 | −3.7835E+00 | 7.8660E+00 | 5.3086E−01 |

| Surface # | 8 | 9 | 10 | 11 | 12 | 13 |
|---|---|---|---|---|---|---|
| k = | −2.8703E+01 | −4.9094E+00 | −8.3229E+00 | −5.4902E+00 | −9.5149E+00 | −5.4816E+00 |
| A4 = | 1.0269E−01 | −6.7248E−01 | −2.9662E−01 | −2.5031E−01 | −2.6555E−01 | −1.5119E−01 |
| A6 = | 9.5798E−02 | 1.1001E+00 | 1.2285E+00 | 7.0559E−01 | 6.1805E−02 | 5.1411E−02 |
| A8 = | −8.4598E−02 | −8.9725E−01 | −1.7300E+00 | −7.9393E−01 | −7.5944E−03 | −1.3276E−02 |
| A10 = | −4.3876E−01 | 5.7528E−01 | 1.4453E+00 | 5.9509E−01 | 1.1791E−02 | 1.2922E−03 |
| A12 = | 2.6767E−01 | −5.1121E−02 | −7.8973E−01 | −2.6633E−01 | 1.7571E−03 | 3.9640E−04 |
| A14 = | −6.4012E−02 | — | 2.6958E−01 | 6.0374E−02 | −1.6464E−04 | −7.3042E−05 |
| A16 = | — | — | −4.3538E−02 | −5.2845E−03 | −9.2720E−04 | −8.5760E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.02 | (R11 + R12)/(R11 − R12) | 1.58 |
| Fno | 2.10 | R10/R11 | −0.18 |
| HFOV [deg.] | 44.9 | f2/f3 | 0.10 |
| (T12 + T23)/CT1 | 1.45 | f4/f1 | 0.02 |
| T34/(T23 + T45) | 0.05 | f6/f5 | −0.32 |
| T12/f | 0.19 | f6/f1 | −0.02 |
| CTmax/ATmax | 1.41 | Y11/Y62 | 0.68 |
| ATmax/CTmin | 1.59 | SD/TD | 0.73 |
| ATmax/ImgH | 0.19 | TD/Yc62 | 3.35 |
| (R1 − R2)/(R1 + R2) | −0.04 | TL/f | 2.08 |
| (R7 + R8)/(R7 − R8) | 7.11 | tan(HFOV) | 1.00 |

9th Embodiment

Figure 17:
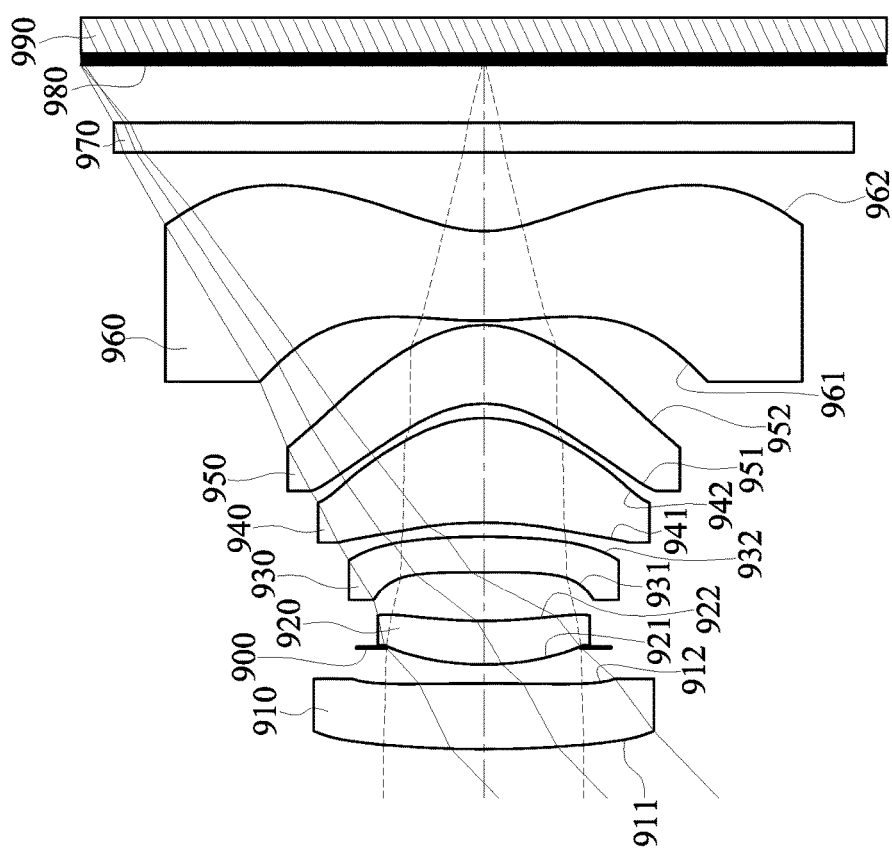
FIG. 17 is a schematic view of an image capturing unit according to the 9th embodiment of the present disclosure.
Figure 18:
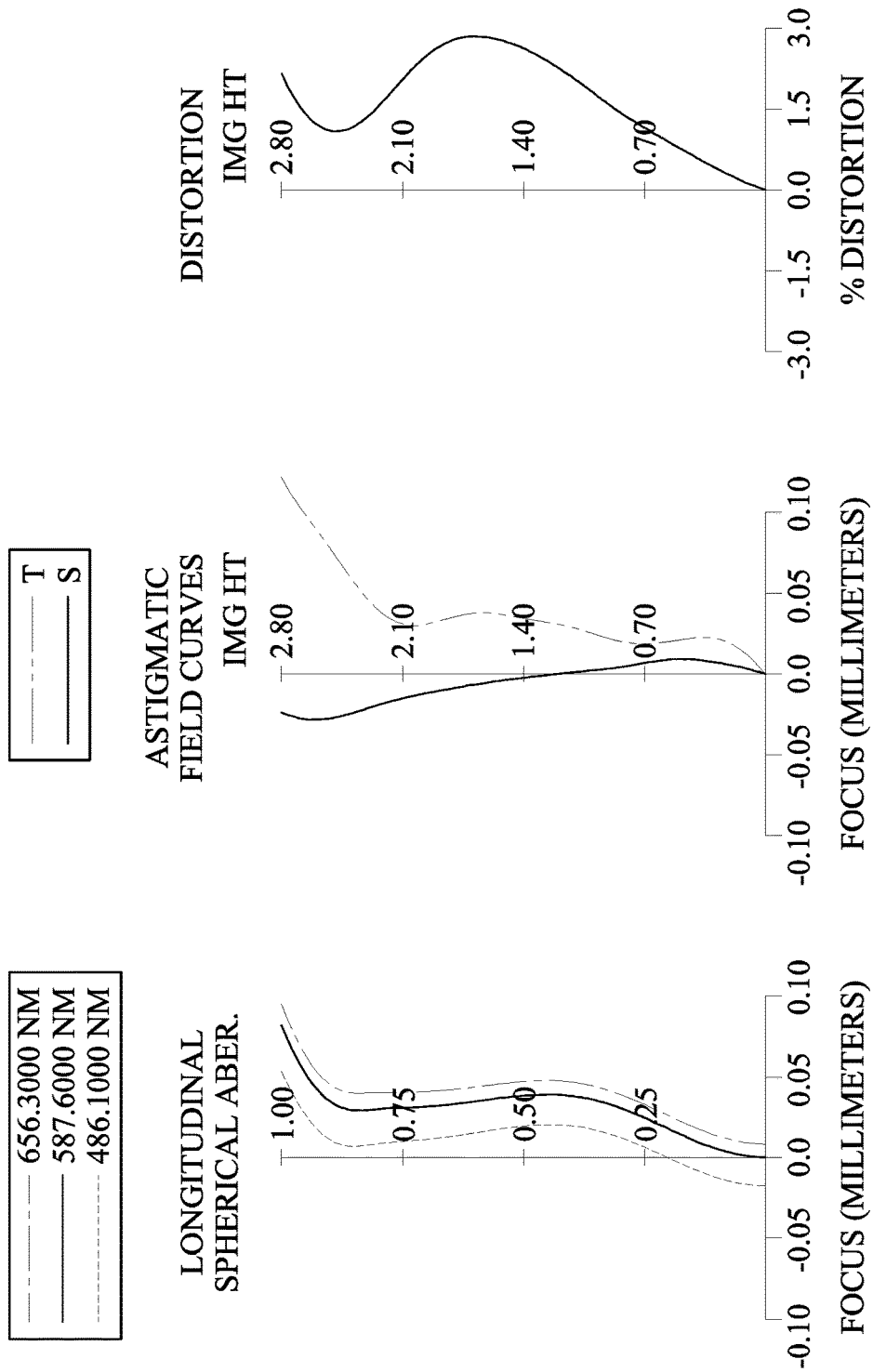
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 990. The optical imaging lens assembly includes, in order from an object side to an image side, a first lens element 910, an aperture stop 900, a second lens element 920, a third lens element 930, a fourth lens element 940, a fifth lens element 950, a sixth lens element 960, an IR-cut filter 970 and an image surface 980, wherein the optical imaging lens assembly has a total of six lens elements (910-960).

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric. The image-side surface 912 of the first lens element 910 has at least one inflection point.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric. The object-side surface 931 of the third lens element 930 has at least one inflection point.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The image-side surface 962 of the sixth lens element 960 has at least one inflection point.

In this embodiment, as shown in Table 17, the sixth lens element 960 has an Abbe number less than 30.

The IR-cut filter 970 is made of glass material and located between the sixth lens element 960 and the image surface 980, and will not affect the focal length of the optical imaging lens assembly. The image sensor 990 is disposed on or near the image surface 980 of the optical imaging lens assembly.

The detailed optical data of the 9th embodiment are shown in Table 17 and Table 18 below.

TABLE 17

9th Embodiment
f = 2.81 mm, Fno = 2.00, HFOV = 43.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.814 | (ASP) | 0.459 | Plastic | 1.544 | 56.0 | 11.27 |
| 2 | | −27.895 | (ASP) | 0.253 | | | | |
| 3 | Ape. Stop | Plano | | −0.120 | | | | |
| 4 | Lens2 | 1.948 | (ASP) | 0.306 | Plastic | 1.544 | 56.0 | 8.47 |
| 5 | | 3.188 | (ASP) | 0.345 | | | | |
| 6 | Lens 3 | 280.250 | (ASP) | 0.250 | Plastic | 1.530 | 55.8 | 12.39 |
| 7 | | −6.724 | (ASP) | 0.100 | | | | |
| 8 | Lens 4 | −2.844 | (ASP) | 0.733 | Plastic | 1.544 | 56.0 | 2.34 |
| 9 | | −0.958 | (ASP) | 0.100 | | | | |
| 10 | Lens 5 | −0.772 | (ASP) | 0.552 | Plastic | 1.535 | 55.8 | 6.38 |
| 11 | | −0.787 | (ASP) | 0.030 | | | | |
| 12 | Lens 6 | 3.294 | (ASP) | 0.633 | Plastic | 1.634 | 23.8 | −2.20 |
| 13 | | 0.907 | (ASP) | 0.550 | | | | |
| 14 | IR-cut filter | Plano | | 0.210 | Glass | 1.517 | 64.2 | — |
| 15 | | Plano | | 0.403 | | | | |
| 16 | Image | Plano | | — | | | | |

Note:
Reference wavelength is 587.6 nm (d-line).

TABLE 18

Aspheric Coefficients

| Surface # | 1 | 2 | 4 | 5 | 6 | 7 |
|---|---|---|---|---|---|---|
| k = | −2.1154E+01 | −5.0000E+01 | 8.1342E−02 | −1.8995E+01 | 1.0000E+00 | 1.0000E+00 |
| A4 = | −5.2316E−03 | 1.1330E−02 | −1.3613E−02 | 2.4942E−02 | −2.9929E−01 | −1.6880E−01 |
| A6 = | 3.0817E−03 | 3.0045E−02 | 1.1190E−01 | −5.4764E−01 | 4.3146E−01 | 4.0766E−01 |
| A8 = | 8.1166E−03 | 1.4515E−02 | −1.8261E−01 | 1.9860E+00 | −3.4614E+00 | −1.0391E+00 |
| A10 = | 4.9444E−03 | 3.0274E−02 | 1.8946E−01 | −5.0755E+00 | 9.0913E+00 | 1.5235E+00 |
| A12 = | −1.9391E−03 | 9.0698E−05 | 5.1214E−01 | 6.6490E+00 | −1.4236E+01 | −1.3777E+00 |
| A14 = | — | — | −8.4253E−01 | −3.7835E+00 | 7.8660E+00 | — |

| Surface # | 8 | 9 | 10 | 11 | 12 | 13 |
|---|---|---|---|---|---|---|
| k = | −1.0469E+01 | −3.5893E+00 | −1.8846E+00 | −3.5492E+00 | −5.4824E+00 | −4.8820E+00 |
| A4 = | −9.7654E−02 | −5.0592E−01 | −3.4496E−01 | −3.9992E−01 | −2.1583E−01 | −8.9992E−02 |
| A6 = | 1.8878E−01 | 1.0589E+00 | 1.2110E+00 | 6.5466E−01 | 6.5615E−02 | 3.4387E−02 |
| A8 = | 8.6735E−02 | −1.1024E+00 | −1.7534E+00 | −7.8435E−01 | −1.5258E−02 | −9.4753E−03 |
| A10 = | −3.6152E−01 | 4.7527E−01 | 1.4644E+00 | 6.0394E−01 | 2.3006E−03 | 1.2478E−03 |
| A12 = | 2.5437E−01 | −5.0299E−02 | −7.8850E−01 | −2.6604E−01 | −8.8148E−04 | −2.8093E−05 |
| A14 = | −6.4012E−02 | — | 2.7020E−01 | 6.0172E−02 | 1.8622E−04 | −1.1218E−05 |
| A16 = | — | — | −4.3415E−02 | −5.2693E−03 | 2.9262E−05 | 1.0432E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.81 | (R11 + R12)/(R11 − R12) | 1.76 |
| Fno | 2.00 | R10/R11 | −0.24 |
| HFOV [deg.] | 43.9 | f2/f3 | 0.68 |
| (T12 + T23)/CT1 | 1.04 | f4/f1 | 0.21 |
| T34/(T23 + T45) | 0.22 | f6/f5 | −0.35 |
| T12/f | 0.05 | f6/f1 | −0.20 |
| CTmax/ATmax | 2.12 | Y11/Y62 | 0.53 |
| ATmax/CTmin | 1.38 | SD/TD | 0.80 |
| ATmax/ImgH | 0.12 | TD/Yc62 | 2.50 |
| (R1 − R2)/(R1 + R2) | −1.78 | TL/f | 1.71 |
| (R7 + R8)/(R7 − R8) | 2.02 | tan(HFOV) | 0.96 |

10th Embodiment

Figure 19:
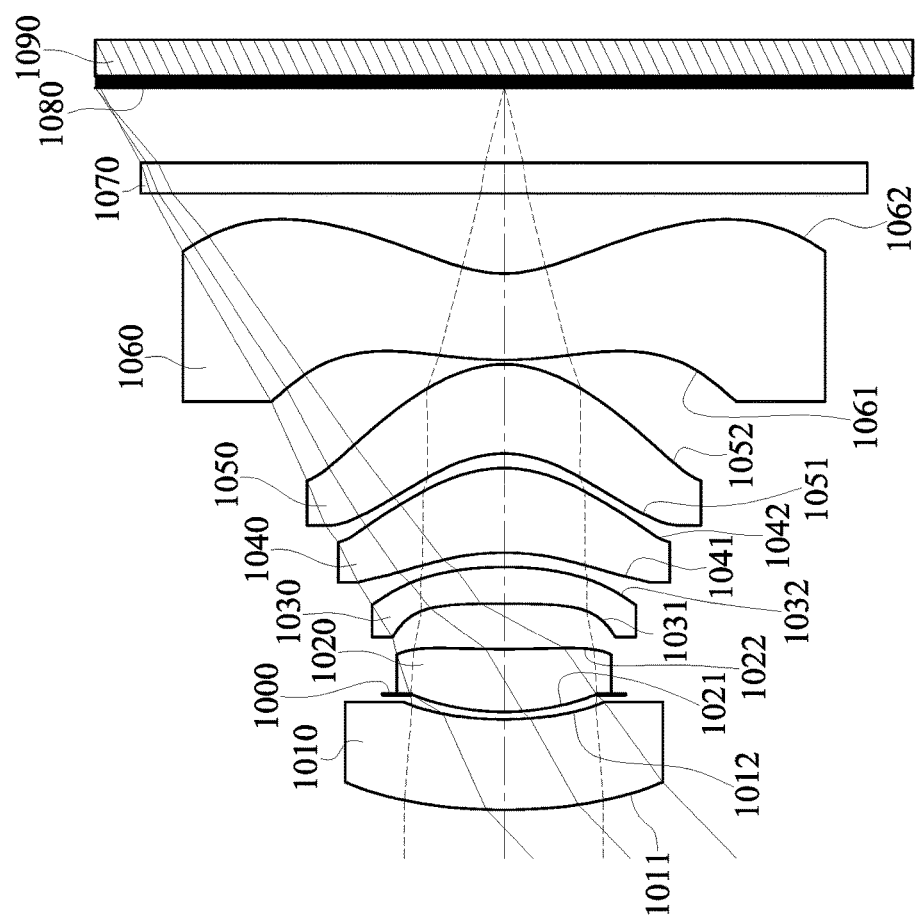
FIG. 19 is a schematic view of an image capturing unit according to the 10th embodiment of the present disclosure.
Figure 20:
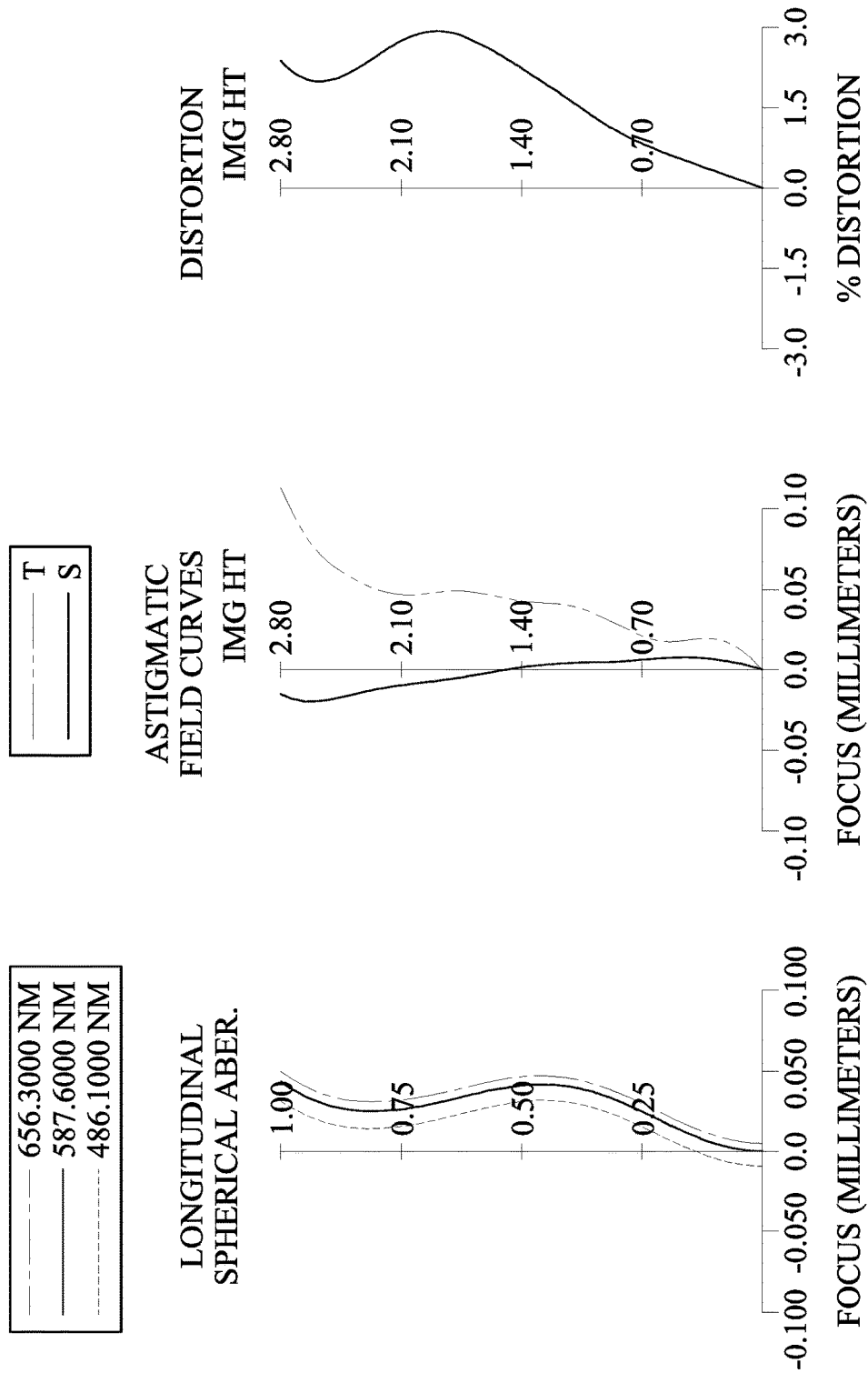
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens assembly (its reference numeral is omitted) of the present disclosure and an image sensor 1090. The optical imaging lens assembly includes, in order from an object side to an image side, a first lens element 1010, an aperture stop 1000, a second lens element 1020, a third lens element 1030, a fourth lens element 1040, a fifth lens element 1050, a sixth lens element 1060, an IR-cut filter 1070 and an image surface 1080, wherein the optical imaging lens assembly has a total of six lens elements (1010-1060).

The first lens element 1010 with negative refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with positive refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being concave in a paraxial region thereof and an image-side surface 1032 being convex in a paraxial region thereof. The third lens element 1030 is made of plastic material and has the object-side surface 1031 and the image-side surface 1032 being both aspheric. The image-side surface 1032 of the third lens element 1030 has at least one inflection point.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with positive refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric.

The sixth lens element 1060 with negative refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. The image-side surface 1062 of the sixth lens element 1060 has at least one inflection point.

In this embodiment, as shown in Table 19, both the first lens element 1010 and the sixth lens element 1060 have an Abbe number less than 30.

The IR-cut filter 1070 is made of glass material and located between the sixth lens element 1060 and the image surface 1080, and will not affect the focal length of the optical imaging lens assembly. The image sensor 1090 is disposed on or near the image surface 1080 of the optical imaging lens assembly.

The detailed optical data of the 10th embodiment are shown in Table 19 and Table 20 below.

TABLE 19

10th Embodiment
f = 2.80 mm, Fno = 2.05, HFOV = 44.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.777 | (ASP) | 0.621 | Plastic | 1.634 | 23.8 | −12.35 |
| 2 | | 2.385 | (ASP) | 0.170 | | | | |
| 3 | Ape. Stop | Plano | | −0.120 | | | | |
| 4 | Lens 2 | 1.670 | (ASP) | 0.431 | Plastic | 1.544 | 56.0 | 3.72 |
| 5 | | 8.635 | (ASP) | 0.315 | | | | |
| 6 | Lens 3 | −18.280 | (ASP) | 0.251 | Plastic | 1.530 | 55.8 | 5.63 |
| 7 | | −2.578 | (ASP) | 0.100 | | | | |
| 8 | Lens 4 | −1.735 | (ASP) | 0.579 | Plastic | 1.544 | 56.0 | 3.06 |
| 9 | | −0.949 | (ASP) | 0.100 | | | | |
| 10 | Lens 5 | −0.807 | (ASP) | 0.612 | Plastic | 1.535 | 55.8 | 4.65 |
| 11 | | −0.771 | (ASP) | 0.030 | | | | |
| 12 | Lens 6 | 2.469 | (ASP) | 0.596 | Plastic | 1.639 | 23.5 | −2.27 |
| 13 | | 0.828 | (ASP) | 0.550 | | | | |
| 14 | IR-cut filter | Plano | | 0.210 | Glass | 1.517 | 64.2 | — |
| 15 | | Plano | | 0.512 | | | | |
| 16 | Image | Plano | | — | | | | |

Note:
Reference wavelength is 587.6 nm (d-line).

TABLE 20

Aspheric Coefficients

| Surface # | 1 | 2 | 4 | 5 | 6 | 7 |
|---|---|---|---|---|---|---|
| k = | −3.9280E+00 | −3.6880E+00 | −9.8984E−01 | −5.0000E+01 | 1.0000E+00 | 1.0000E+00 |
| A4 = | 2.1411E−02 | 5.1158E−02 | −3.9717E−02 | −4.0661E−02 | −3.2125E−01 | −1.9220E−01 |
| A6 = | 7.9495E−03 | 1.0830E−01 | 1.8533E−01 | −5.4123E−01 | 3.5969E−01 | 3.5078E−01 |
| A8 = | −5.1940E−03 | −1.2123E−01 | −3.7656E−01 | 1.8426E+00 | −3.4860E+00 | −1.0708E+00 |
| A10 = | 4.7991E−03 | 3.4677E−01 | 2.8087E−01 | −5.2065E+00 | 8.9775E+00 | 1.6695E+00 |
| A12 = | −7.8517E−04 | 9.0698E−05 | 5.1214E−01 | 6.6490E+00 | −1.4236E+01 | −1.3783E+00 |
| A14 = | — | — | −8.4253E−01 | −3.7835E+00 | 7.8660E+00 | 5.2781E−01 |

| Surface # | 8 | 9 | 10 | 11 | 12 | 13 |
|---|---|---|---|---|---|---|
| k = | −4.2752E+00 | −3.5814E+00 | −1.9183E+00 | −3.4935E+00 | −1.5033E+00 | −4.4539E+00 |
| A4 = | −1.0616E−01 | −4.7958E−01 | −3.3643E−01 | −3.9330E−01 | −1.9515E−01 | −8.4148E−02 |
| A6 = | 2.1664E−01 | 1.0699E+00 | 1.2281E+00 | 6.5227E−01 | 5.6823E−02 | 3.1629E−02 |
| A8 = | 1.0763E−01 | −1.1006E+00 | −1.7421E+00 | −7.8565E−01 | −1.6460E−02 | −8.9972E−03 |
| A10 = | −3.7100E−01 | 4.7726E−01 | 1.4656E+00 | 6.0398E−01 | 2.3273E−03 | 1.2753E−03 |
| A12 = | 2.4863E−01 | −5.0907E−02 | −7.9045E−01 | −2.6561E−01 | −6.2524E−04 | −3.7641E−05 |
| A14 = | −6.4347E−02 | — | 2.6947E−01 | 6.0353E−02 | 2.4011E−04 | −1.2037E−05 |
| A16 = | — | — | −4.3651E−02 | −5.0462E−03 | −3.1037E−06 | 1.1773E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 2.80 | (R11 + R12)/(R11 − R12) | 2.01 |
| Fno | 2.05 | R10/R11 | −0.31 |
| HFOV [deg.] | 44.1 | f2/f3 | 0.66 |
| (T12 + T23)/CT1 | 0.59 | f4/f1 | −0.25 |

-continued

| 10th Embodiment | | | |
|---|---|---|---|
| T34/(T23 + T45) | 0.24 | f6/f5 | −0.49 |
| T12/f | 0.02 | f6/f1 | 0.18 |
| CTmax/ATmax | 1.97 | Y11/Y62 | 0.49 |
| ATmax/CTmin | 1.25 | SD/TD | 0.79 |

-continued

| 10th Embodiment | | | |
|---|---|---|---|
| ATmax/ImgH | 0.11 | TD/Yc62 | 2.42 |
| (R1 − R2)/(R1 + R2) | 0.23 | TL/f | 1.77 |
| (R7 + R8)/(R7 − R8) | 3.42 | tan(HFOV) | 0.97 |

11th Embodiment

Figure 21:
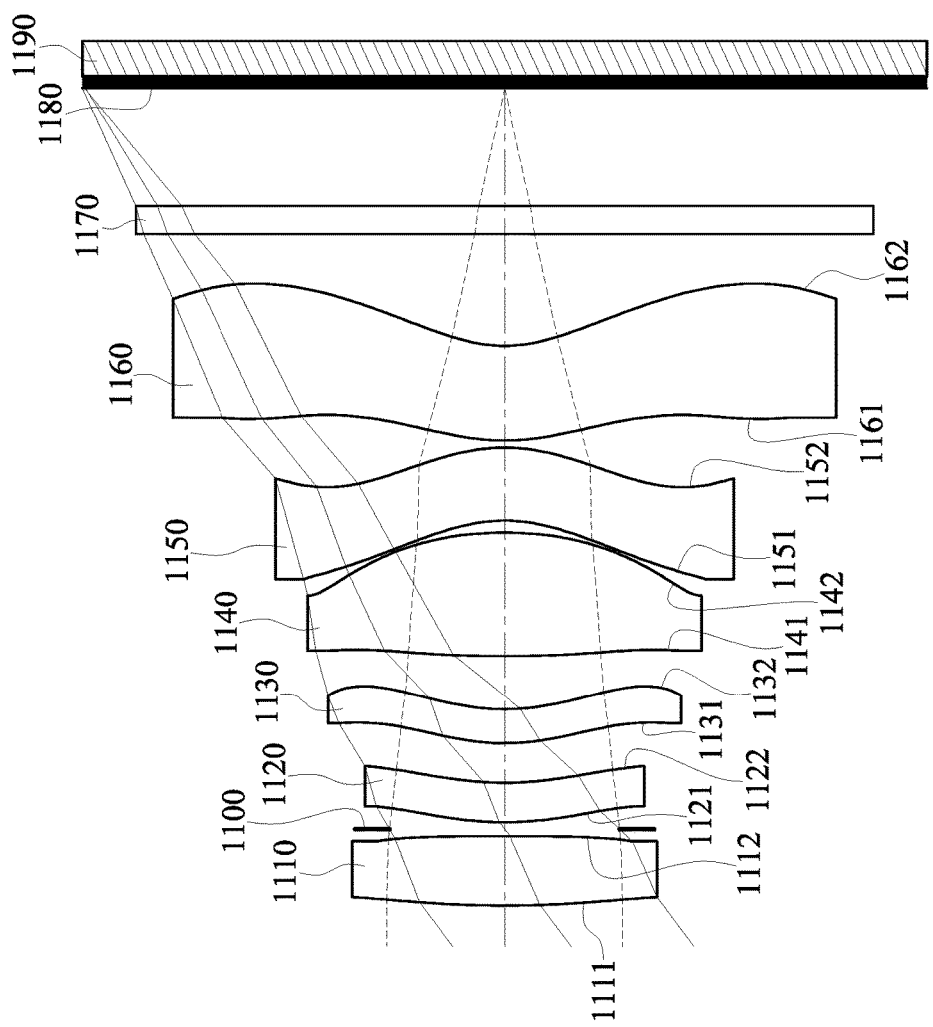
FIG. 21 is a schematic view of an image capturing unit according to the 11th embodiment of the present disclosure.
Figure 22:
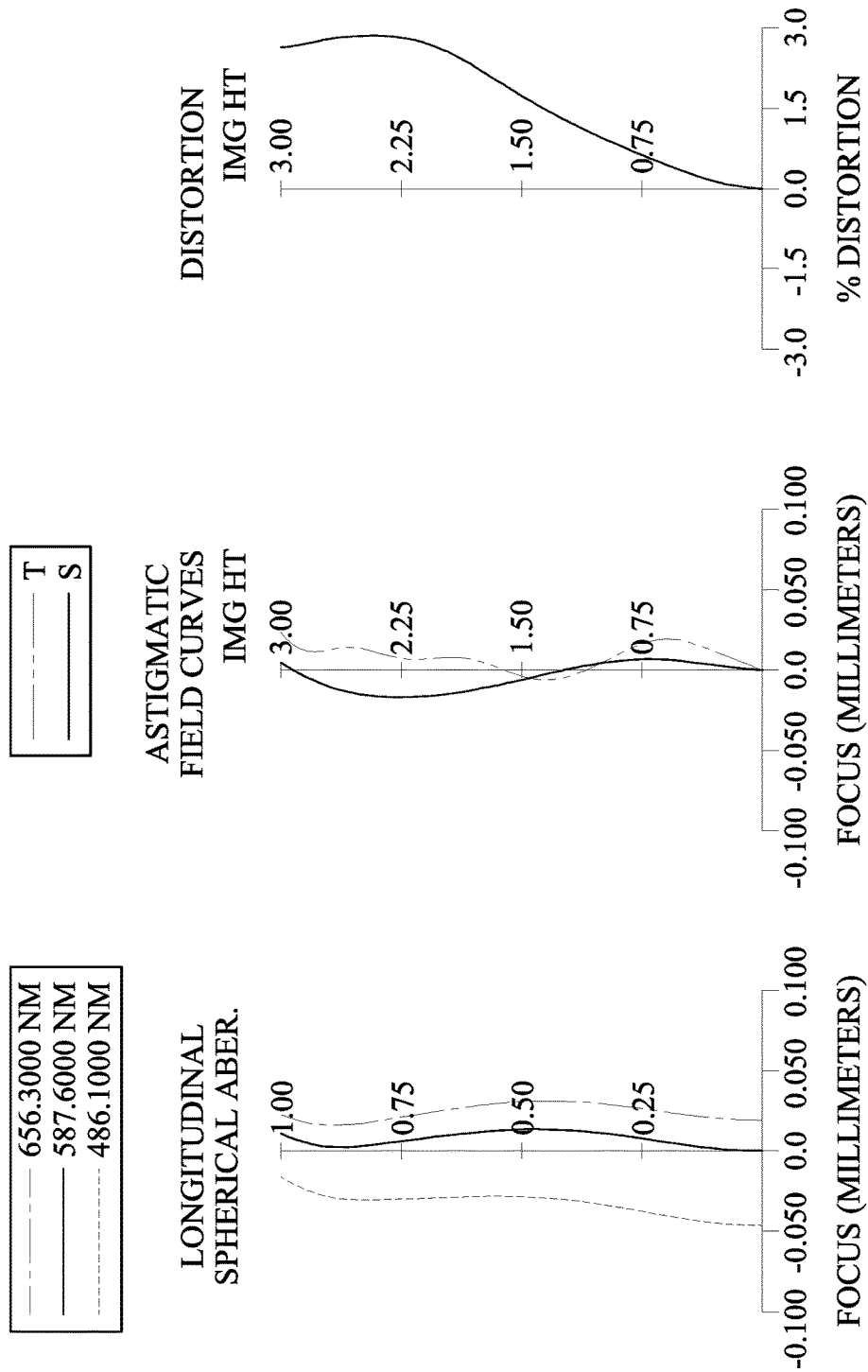
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical imaging lens assembly (its reference numeral is omitted) of the present disclosure and an image sensor 1190. The optical imaging lens assembly includes, in order from an object side to an image side, a first lens element 1110, an aperture stop 1100, a second lens element 1120, a third lens element 1130, a fourth lens element 1140, a fifth lens element 1150, a sixth lens element 1160, an IR-cut filter 1170 and an image surface 1180, wherein the optical imaging lens assembly has a total of six lens elements (1110-1160).

The first lens element 1110 with positive refractive power has an object-side surface 1111 being convex in a paraxial region thereof and an image-side surface 1112 being convex in a paraxial region thereof. The first lens element 1110 is made of plastic material and has the object-side surface 1111 and the image-side surface 1112 being both aspheric. The object-side surface 1111 of the first lens element 1110 has at least one inflection point.

The second lens element 1120 with positive refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric. Both the object-side surface 1131 and the image-side surface 1132 of the third lens element 1130 have at least one inflection point.

The fourth lens element 1140 with positive refractive power has an object-side surface 1141 being convex in a paraxial region thereof and an image-side surface 1142 being convex in a paraxial region thereof. The fourth lens element 1140 is made of plastic material and has the object-side surface 1141 and the image-side surface 1142 being both aspheric.

The fifth lens element 1150 with positive refractive power has an object-side surface 1151 being concave in a paraxial region thereof and an image-side surface 1152 being convex in a paraxial region thereof. The fifth lens element 1150 is made of plastic material and has the object-side surface 1151 and the image-side surface 1152 being both aspheric.

The sixth lens element 1160 with negative refractive power has an object-side surface 1161 being convex in a paraxial region thereof and an image-side surface 1162 being concave in a paraxial region thereof. The sixth lens element 1160 is made of plastic material and has the object-side surface 1161 and the image-side surface 1162 being both aspheric. The image-side surface 1162 of the sixth lens element 1160 has at least one inflection point.

In this embodiment, as shown in Table 21, both the second lens element 1120 and the fifth lens element 1150 have an Abbe number less than 30.

The IR-cut filter 1170 is made of glass material and located between the sixth lens element 1160 and the image surface 1180, and will not affect the focal length of the optical imaging lens assembly. The image sensor 1190 is disposed on or near the image surface 1180 of the optical imaging lens assembly.

The detailed optical data of the 11th embodiment are shown in Table 21 and Table 22 below.

TABLE 21

11th Embodiment
f = 3.88 mm, Fno = 2.30, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.803 | (ASP) | 0.495 | Plastic | 1.535 | 56.3 | 13.84 |
| 2 | | −139.860 | (ASP) | 0.050 | | | | |
| 3 | Ape. Stop | Plano | | 0.050 | | | | |
| 4 | Lens 2 | 2.346 | (ASP) | 0.283 | Plastic | 1.650 | 21.4 | 75.42 |
| 5 | | 2.347 | (ASP) | 0.283 | | | | |
| 6 | Lens 3 | 1.624 | (ASP) | 0.244 | Plastic | 1.535 | 55.8 | 70.80 |
| 7 | | 1.607 | (ASP) | 0.381 | | | | |
| 8 | Lens 4 | 8.351 | (ASP) | 0.885 | Plastic | 1.535 | 55.8 | 3.64 |
| 9 | | −2.441 | (ASP) | 0.085 | | | | |
| 10 | Lens 5 | −1.135 | (ASP) | 0.522 | Plastic | 1.639 | 23.3 | 54.04 |
| 11 | | −1.296 | (ASP) | 0.050 | | | | |
| 12 | Lens 6 | 1.565 | (ASP) | 0.681 | Plastic | 1.535 | 55.8 | −8.39 |
| 13 | | 0.984 | (ASP) | 0.800 | | | | |
| 14 | IR-cut filter | Plano | | 0.200 | Glass | 1.517 | 64.2 | — |
| 15 | | Plano | | 0.848 | | | | |
| 16 | Image | Plano | | — | | | | |

Note:
Reference wavelength is 587.6 nm (d-line).

TABLE 22

Aspheric Coefficients

| Surface # | 1 | 2 | 4 | 5 | 6 | 7 |
|---|---|---|---|---|---|---|
| k = | 3.0897E+00 | −3.0000E+01 | −5.7514E+00 | 9.1138E−01 | −1.5011E+00 | −3.4525E+00 |
| A4 = | −3.0217E−03 | −4.7732E−02 | −3.8831E−02 | −1.2361E−01 | −1.6271E−01 | −5.8742E−02 |
| A6 = | −5.6093E−03 | 5.1736E−03 | −1.2000E−02 | 2.3761E−02 | 2.2239E−02 | −5.4530E−02 |
| A8 = | −2.9664E−04 | 1.9692E−03 | −2.8990E−02 | −3.6710E−02 | −3.3206E−02 | 1.4242E−02 |
| A10 = | −5.2981E−04 | −9.9889E−03 | 2.8473E−02 | 1.6205E−02 | 3.7367E−02 | 2.2280E−02 |
| A12 = | −1.0295E−03 | 3.0856E−03 | −1.5751E−02 | 6.9332E−03 | −1.0025E−02 | −2.3940E−02 |
| A14 = | — | — | 1.2217E−03 | −2.7924E−03 | −2.2734E−04 | 5.9007E−03 |

| Surface # | 8 | 9 | 10 | 11 | 12 | 13 |
|---|---|---|---|---|---|---|
| k = | 1.7476E+01 | 5.4796E−01 | −3.9688E+00 | −3.3830E+00 | −1.4825E+00 | −3.7596E+00 |
| A4 = | 4.5126E−04 | −2.4680E−02 | 1.9514E−02 | 1.9971E−02 | −2.2097E−01 | −7.6881E−02 |
| A6 = | −3.3030E−02 | −2.7055E−03 | 6.4763E−03 | 6.1736E−02 | 1.2550E−01 | 3.6423E−02 |
| A8 = | 2.8137E−02 | 1.8676E−02 | 2.6813E−02 | −4.0343E−02 | −6.1807E−02 | −1.4689E−02 |
| A10 = | −1.8807E−02 | −1.3857E−02 | −3.8521E−02 | 1.6839E−02 | 2.1430E−02 | 3.9365E−03 |
| A12 = | −4.2174E−05 | 2.1783E−03 | 1.9476E−02 | −4.2732E−03 | −4.3671E−03 | −6.5027E−04 |
| A14 = | 4.2958E−03 | 1.2403E−03 | −3.9469E−03 | 4.3026E−04 | 4.6971E−04 | 5.9454E−05 |
| A16 = | −8.8203E−04 | — | 1.7209E−04 | 1.2278E−06 | −2.0727E−05 | −2.2797E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 3.88 | (R11 + R12)/(R11 − R12) | 4.39 |
| Fno | 2.30 | R10/R11 | −0.83 |
| HFOV [deg.] | 36.8 | f2/f3 | 1.07 |
| (T12 + T23)/CT1 | 0.77 | f4/f1 | 0.26 |
| T34/(T23 + T45) | 1.04 | f6/f5 | −0.16 |
| T12/f | 0.03 | f6/f1 | −0.61 |
| CTmax/ATmax | 2.32 | Y11/Y62 | 0.46 |
| ATmax/CTmin | 1.56 | SD/TD | 0.86 |
| ATmax/ImgH | 0.13 | TD/Yc62 | 2.25 |
| (R1 − R2)/(R1 + R2) | −1.12 | TL/f | 1.51 |
| (R7 + R8)/(R7 − R8) | 0.55 | tan(HFOV) | 0.75 |

12th Embodiment

Figure 23:
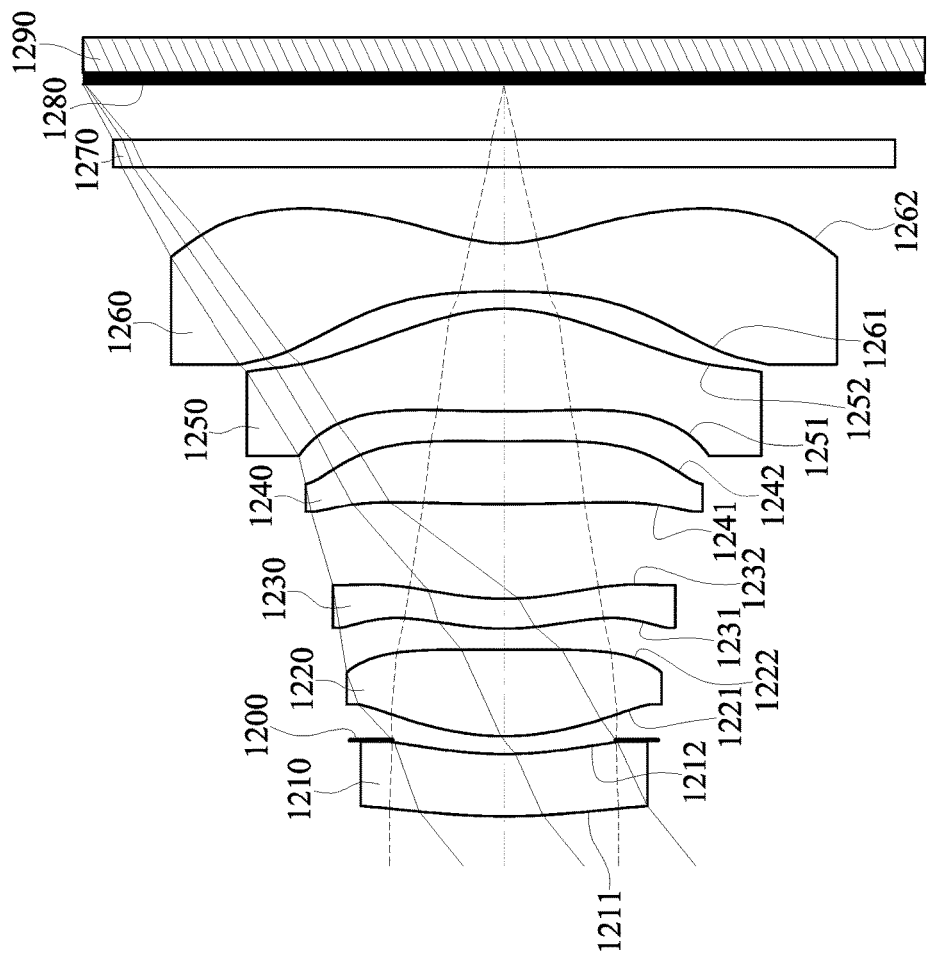
FIG. 23 is a schematic view of an image capturing unit according to the 12th embodiment of the present disclosure.
Figure 24:
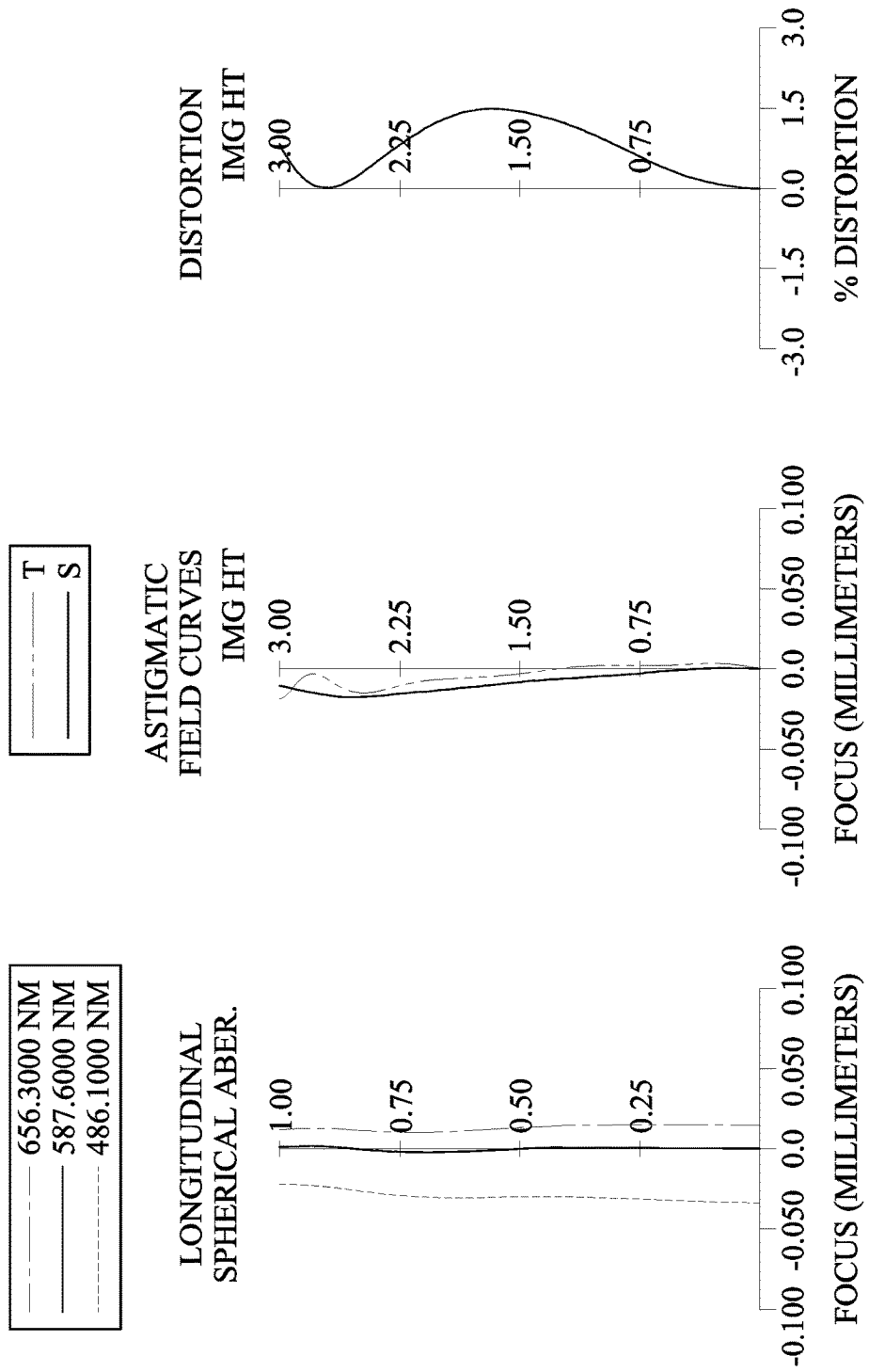
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the optical imaging lens assembly (its reference numeral is omitted) of the present disclosure and an image sensor 1290. The optical imaging lens assembly includes, in order from an object side to an image side, a first lens element 1210, an aperture stop 1200, a second lens element 1220, a third lens element 1230, a fourth lens element 1240, a fifth lens element 1250, a sixth lens element 1260, an IR-cut filter 1270 and an image surface 1280, wherein the optical imaging lens assembly has a total of six lens elements (1210-1260).

The first lens element 1210 with negative refractive power has an object-side surface 1211 being convex in a paraxial region thereof and an image-side surface 1212 being concave in a paraxial region thereof. The first lens element 1210 is made of plastic material and has the object-side surface 1212 and the image-side surface 1212 being both aspheric. The object-side surface 1211 of the first lens element 1210 has at least one inflection point.

The second lens element 1220 with positive refractive power has an object-side surface 1221 being convex in a paraxial region thereof and an image-side surface 1222 being concave in a paraxial region thereof. The second lens element 1220 is made of plastic material and has the object-side surface 1221 and the image-side surface 1222 being both aspheric.

The third lens element 1230 with positive refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric. Both the object-side surface 1231 and the image-side surface 1232 of the third lens element 1230 have at least one inflection point.

The fourth lens element 1240 with positive refractive power has an object-side surface 1241 being convex in a paraxial region thereof and an image-side surface 1242 being concave in a paraxial region thereof. The fourth lens element 1240 is made of plastic material and has the object-side surface 1241 and the image-side surface 1242 being both aspheric.

The fifth lens element 1250 with positive refractive power has an object-side surface 1251 being convex in a paraxial region thereof and an image-side surface 1252 being convex in a paraxial region thereof. The fifth lens element 1250 is made of plastic material and has the object-side surface 1251 and the image-side surface 1252 being both aspheric.

The sixth lens element 1260 with negative refractive power has an object-side surface 1261 being concave in a paraxial region thereof and an image-side surface 1262 being concave in a paraxial region thereof. The sixth lens element 1260 is made of plastic material and has the object-side surface 1261 and the image-side surface 1262 being both aspheric. The image-side surface 1262 of the sixth lens element 1260 has at least one inflection point.

In this embodiment, as shown in Table 23, the first lens element 1210, the third lens element 1230, the fifth lens element 1250 and the sixth lens element 1260 all have an Abbe number less than 30.

The IR-cut filter 1270 is made of glass material and located between the sixth lens element 1260 and the image surface 1280, and will not affect the focal length of the optical imaging lens assembly. The image sensor 1290 is disposed on or near the image surface 1280 of the optical imaging lens assembly.

The detailed optical data of the 12th embodiment are shown in Table 23 and Table 24 below.

TABLE 23

12th Embodiment
f = 3.69 mm, Fno = 2.25, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.597 | (ASP) | 0.449 | Plastic | 1.640 | 23.3 | −11.41 |
| 2 | | 2.714 | (ASP) | 0.100 | | | | |
| 3 | Ape. Stop | Plano | | 0.029 | | | | |
| 4 | Lens 2 | 1.900 | (ASP) | 0.616 | Plastic | 1.544 | 55.9 | 3.77 |
| 5 | | 23.088 | (ASP) | 0.153 | | | | |
| 6 | Lens 3 | 1.983 | (ASP) | 0.213 | Plastic | 1.640 | 23.3 | 35.14 |
| 7 | | 2.084 | (ASP) | 0.680 | | | | |
| 8 | Lens 4 | 12.498 | (ASP) | 0.450 | Plastic | 1.544 | 55.9 | 64.09 |
| 9 | | 19.231 | (ASP) | 0.214 | | | | |
| 10 | Lens 5 | 8.377 | (ASP) | 0.735 | Plastic | 1.640 | 23.3 | 1.72 |
| 11 | | −1.223 | (ASP) | 0.122 | | | | |
| 12 | Lens 6 | −8.294 | (ASP) | 0.344 | Plastic | 1.640 | 23.3 | −1.35 |
| 13 | | 0.982 | (ASP) | 0.550 | | | | |
| 14 | IR-cut filter | Plano | | 0.195 | Glass | 1.517 | 64.2 | — |
| 15 | | Plano | | 0.398 | | | | |
| 16 | Image | Plano | | — | | | | |

Note:
Reference wavelength is 587.6 nm (d-line).

TABLE 24

Aspheric Coefficients

| Surface # | 1 | 2 | 4 | 5 | 6 | 7 |
|---|---|---|---|---|---|---|
| k = | −1.5304E+01 | −6.6318E+00 | −1.6852E+00 | −3.0000E+01 | −1.8831E+00 | −3.2577E+00 |
| A4 = | −2.6308E−02 | −5.6497E−02 | −1.9313E−02 | −1.0363E−01 | −1.9177E−01 | −9.1807E−02 |
| A6 = | −3.7242E−04 | −2.8739E−03 | −7.6546E−03 | 6.5679E−02 | 7.5881E−03 | −6.4161E−02 |
| A8 = | 4.4041E−03 | 3.0564E−02 | −7.4821E−04 | −1.0280E−01 | −6.1294E−02 | 2.6505E−02 |
| A10 = | 6.8321E−04 | −5.8183E−03 | −5.8926E−04 | 3.8713E−02 | 5.5757E−02 | 3.3994E−02 |
| A12 = | −7.5430E−04 | −4.0024E−03 | −2.5146E−04 | 1.0061E−02 | 2.1093E−03 | −2.2445E−02 |
| A14 = | — | — | −6.2893E−03 | −1.1098E−02 | −4.9023E−03 | 4.3913E−03 |

| Surface # | 8 | 9 | 10 | 11 | 12 | 13 |
|---|---|---|---|---|---|---|
| k = | 1.9446E+01 | −3.0000E+01 | −1.8740E+01 | −8.5467E+00 | −2.4745E+01 | −6.9875E+00 |
| A4 = | −2.3160E−02 | −1.2021E−01 | −7.9450E−02 | −6.8306E−02 | −1.8560E−01 | −9.8455E−02 |
| A6 = | −2.2396E−02 | 8.3615E−03 | −2.2903E−02 | 8.2573E−02 | 1.2646E−01 | 5.2774E−02 |
| A8 = | 3.0031E−02 | 1.1464E−02 | 6.0398E−02 | −5.2199E−02 | −6.7787E−02 | −2.1198E−02 |
| A10 = | −2.5402E−02 | −1.5147E−02 | −6.1923E−02 | 2.1977E−02 | 2.6838E−02 | 5.4670E−03 |
| A12 = | 2.2745E−04 | 3.6357E−03 | 2.5556E−02 | −5.3073E−03 | −5.9334E−03 | −8.7101E−04 |
| A14 = | 6.3339E−03 | 9.9384E−04 | −2.8326E−03 | 6.3643E−04 | 6.3013E−04 | 7.6494E−05 |
| A16 = | −1.4175E−03 | — | −4.5197E−04 | −2.9927E−05 | −2.5128E−05 | −2.7817E−06 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 3.69 | (R11 + R12)/(R11 − R12) | 0.79 |
| Fno | 2.25 | R10/R11 | 0.15 |
| HFOV [deg.] | 38.9 | f2/f3 | 0.11 |
| (T12 + T23)/CT1 | 0.63 | f4/f1 | −5.62 |
| T34/(T23 + T45) | 1.85 | f6/f5 | −0.79 |

-continued

| 12th Embodiment | | | |
|---|---|---|---|
| T12/f | 0.03 | f6/f1 | 0.12 |
| CTmax/ATmax | 1.08 | Y11/Y62 | 0.43 |
| ATmax/CTmin | 3.19 | SD/TD | 0.87 |
| ATmax/ImgH | 0.23 | TD/Yc62 | 2.89 |
| (R1 − R2)/(R1 + R2) | 0.26 | TL/f | 1.42 |
| (R7 + R8)/(R7 − R8) | −4.71 | tan(HFOV) | 0.81 |

The foregoing description, for the purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising six lens elements, the six lens elements being, in order from an object side to an image side: a first lens element, a second lens element, a third lens element, a fourth lens element, a fifth lens element and a sixth lens element; each of the six lens elements having an object-side surface facing toward the object side and an image-side surface facing toward the image side;
wherein the object-side surface of the first lens element is concave in a paraxial region thereof, the object-side surface of the third lens element is convex in a paraxial region thereof, the image-side surface of the third lens element is concave in a paraxial region thereof, the image-side surface of the sixth lens element is concave in a paraxial region thereof, the image-side surface of the sixth lens element is aspheric and has at least one inflection point, and each of at least two of the six lens elements of the optical imaging lens assembly has an Abbe number less than 30;
wherein an axial distance between the object-side surface of the first lens element and an image surface is TL, a focal length of the optical imaging lens assembly is f, a curvature radius of the object-side surface of the fourth lens element is R7, a curvature radius of the image-side surface of the fourth lens element is R8, and the following conditions are satisfied:

$1.53 \leq TL/f < 2.85$; and $0 < (R7+R8)/(R7-R8) \leq 1.13$.

2. The optical imaging lens assembly of claim 1, wherein at least one of the object-side surface and the image-side surface of the first lens element has at least one inflection point, and the sixth lens element has negative refractive power.

3. The optical imaging lens assembly of claim 1, wherein the object-side surface of the sixth lens element is convex in a paraxial region thereof.

4. The optical imaging lens assembly of claim 1, wherein the image-side surface of the fourth lens element is convex in a paraxial region thereof, and each of the six lens elements of the optical imaging lens assembly is a single and non-cemented lens element.

5. The optical imaging lens assembly of claim 1, further comprising an aperture stop disposed between the first lens element and the third lens element, wherein at least one lens surface among the object-side surfaces and the image-side surfaces of the first lens element, the second lens element, the third lens element, the fourth lens element and the fifth lens element is aspheric, and at least one of the object-side surface and the image-side surface of the third lens element has at least one inflection point.

6. The optical imaging lens assembly of claim 1, wherein a focal length of the first lens element is f1, a focal length of the sixth lens element is f6, and the following condition is satisfied:

$-5.0 < f6/f1 < 0.50$.

7. The optical imaging lens assembly of claim 1, wherein a central thickness of the first lens element is smaller than a central thickness of the second lens element.

8. An optical imaging lens assembly comprising six lens elements, the six lens elements being, in order from an object side to an image side: a first lens element, a second lens element, a third lens element, a fourth lens element, a fifth lens element and a sixth lens element; each of the six lens elements having an object-side surface facing toward the object side and an image-side surface facing toward the image side;
wherein the object-side surface of the first lens element is concave in a paraxial region thereof, the object-side surface of the third lens element is convex in a paraxial region thereof, the image-side surface of the third lens element is concave in a paraxial region thereof, the image-side surface of the sixth lens element is concave in a paraxial region thereof, the image-side surface of the sixth lens element is aspheric and has at least one inflection point, each of at least two of the six lens elements of the optical imaging lens assembly has an Abbe number less than 30, and a central thickness of the fourth lens element is larger than a central thickness of the fifth lens element;
wherein an axial distance between the object-side surface of the first lens element and an image surface is TL, a focal length of the optical imaging lens assembly is f, and the following condition is satisfied:

$1.53 \leq TL/f < 2.85$.

9. The optical imaging lens assembly of claim 8, wherein the first lens element has negative refractive power, and the object-side surface of the second lens element is convex in a paraxial region thereof.

10. The optical imaging lens assembly of claim 8, wherein the object-side surface of the fourth lens element is convex in a paraxial region thereof.

11. The optical imaging lens assembly of claim 8, wherein a maximum effective radius of the object-side surface of the first lens element is Y11, a maximum effective radius of the image-side surface of the sixth lens element is Y62, and the following condition is satisfied:

$Y11/Y62 < 0.90$.

12. The optical imaging lens assembly of claim 8, wherein at least one of the object-side surface and the image-side surface of the first lens element has at least one inflection point, a focal length of the first lens element is f1, a focal length of the fourth lens element is f4, and the following condition is satisfied:

$-0.80 < f4/f1$.

13. The optical imaging lens assembly of claim 8, wherein an axial distance between the object-side surface of the first lens element and the image-side surface of the sixth lens element is TD, a vertical distance between a non-axial critical point on the image-side surface of the sixth lens element and an optical axis is Yc62, and the following condition is satisfied:

$1.0 < TD/Yc62 < 4.0$.

14. The optical imaging lens assembly of claim 8, wherein an axial distance between the fourth lens element and the fifth lens element is larger than an axial distance between the fifth lens element and the sixth lens element.

15. An optical imaging lens assembly comprising six lens elements, the six lens elements being, in order from an object side to an image side: a first lens element, a second lens element, a third lens element, a fourth lens element, a fifth lens element and a sixth lens element; each of the six lens elements having an object-side surface facing toward the object side and an image-side surface facing toward the image side;
wherein the object-side surface of the first lens element is concave in a paraxial region thereof, the second lens element has positive refractive power, the image-side surface of the sixth lens element is concave in a paraxial region thereof, the image-side surface of the sixth lens element is aspheric and has at least one inflection point, each of at least two of the six lens elements of the optical imaging lens assembly has an Abbe number less than 30, and an absolute value of a focal length of the fourth lens element is a minimum among absolute values of focal lengths of the six lens elements;
wherein an axial distance between the object-side surface of the first lens element and an image surface is TL, a focal length of the optical imaging lens assembly is f, and the following condition is satisfied:

$1.53 \leq TL/f < 2.85.$

16. The optical imaging lens assembly of claim 15, wherein the object-side surface of the third lens element is convex in a paraxial region thereof, and the image-side surface of the third lens element is concave in a paraxial region thereof.

17. The optical imaging lens assembly of claim 15, wherein the object-side surface of the sixth lens element is convex in a paraxial region thereof.

18. The optical imaging lens assembly of claim 15, wherein the fourth lens element has positive refractive power, and the image-side surface of the fourth lens element is convex in a paraxial region thereof.

19. The optical imaging lens assembly of claim 15, wherein a maximum central thickness among all central thicknesses of the lens elements of the optical imaging lens assembly is CTmax, a maximum axial distance among all axial distances between adjacent lens elements of the optical imaging lens assembly is ATmax, and the following condition is satisfied:

$1.1 < CTmax/ATmax < 5.0.$

20. The optical imaging lens assembly of claim 15, wherein an axial distance between the first lens element and the second lens element is T12, the focal length of the optical imaging lens assembly is f, and the following condition is satisfied:

$0 < T12/f < 0.10.$

21. An optical imaging lens assembly comprising six lens elements, the six lens elements being, in order from an object side to an image side: a first lens element, a second lens element, a third lens element, a fourth lens element, a fifth lens element and a sixth lens element; each of the six lens elements having an object-side surface facing toward the object side and an image-side surface facing toward the image side;
wherein the object-side surface of the first lens element is concave in a paraxial region thereof, the image-side surface of the sixth lens element is concave in a paraxial region thereof, the image-side surface of the sixth lens element is aspheric and has at least one inflection point, each of at least two of the six lens elements of the optical imaging lens assembly has an Abbe number less than 30, and an axial distance between the first lens element and the second lens element is a maximum among all axial distances between adjacent lens elements of the optical imaging lens assembly;
wherein an axial distance between the object-side surface of the first lens element and an image surface is TL, a focal length of the optical imaging lens assembly is f, a maximum effective radius of the object-side surface of the first lens element is Y11, a maximum effective radius of the image-side surface of the sixth lens element is Y62, and the following conditions are satisfied:

$0.70 < TL/f < 2.85;$ and $Y11/Y62 < 0.90.$

22. The optical imaging lens assembly of claim 21, wherein the object-side surface of the sixth lens element is convex in a paraxial region thereof.

23. The optical imaging lens assembly of claim 21, wherein at least one of the object-side surface and the image-side surface of the first lens element has at least one inflection point, and the sixth lens element has negative refractive power.

24. The optical imaging lens assembly of claim 21, wherein the image-side surface of the fifth lens element is convex in a paraxial region thereof.

25. The optical imaging lens assembly of claim 21, wherein a maximum axial distance among all axial distances between adjacent lens elements of the optical imaging lens assembly is ATmax, a minimum central thickness among all central thicknesses of the lens elements of the optical imaging lens assembly is CTmin, and the following condition is satisfied:

$ATmax/CTmin < 2.0.$

26. The optical imaging lens assembly of claim 21, wherein each of the six lens elements of the optical imaging lens assembly is a single and non-cemented lens element, an axial distance between the object-side surface of the first lens element and the image-side surface of the sixth lens element is TD, a vertical distance between a non-axial critical point on the image-side surface of the sixth lens element and an optical axis is Yc62, and the following condition is satisfied:

$1.0 < TD/Yc62 < 4.0.$

27. The optical imaging lens assembly of claim 21, further comprising an aperture stop disposed between the first lens element and the second lens element.

28. The optical imaging lens assembly of claim 21, wherein an absolute value of a focal length of the second lens element is smaller than an absolute value of a focal length of the third lens element.

29. The optical imaging lens assembly of claim 21, wherein a curvature radius of the object-side surface of the third lens element and a curvature radius of the image-side surface of the third lens element are both positive or both negative.

30. An image capturing unit, comprising:
the optical imaging lens assembly of claim 21; and
an image sensor, wherein the image sensor is disposed on the image surface of the optical imaging lens assembly.

31. An electronic device, comprising:
the image capturing unit of claim 30.

32. An optical imaging lens assembly comprising six lens elements, the six lens elements being, in order from an object side to an image side: a first lens element, a second lens element, a third lens element, a fourth lens element, a fifth lens element and a sixth lens element; each of the six lens elements having an object-side surface facing toward the object side and an image-side surface facing toward the image side;
wherein the object-side surface of the first lens element is concave in a paraxial region thereof, the image-side surface of the sixth lens element is concave in a paraxial region thereof, the image-side surface of the sixth lens element is aspheric and has at least one inflection point, each of at least two of the six lens elements of the optical imaging lens assembly has an Abbe number less than 30, and an axial distance between the first lens element and the second lens element is a maximum among all axial distances between adjacent lens elements of the optical imaging lens assembly;
wherein the optical imaging lens assembly further comprises an aperture stop, an axial distance between the object-side surface of the first lens element and an image surface is TL, a focal length of the optical imaging lens assembly is f, an axial distance between the aperture stop and the image-side surface of the sixth lens element is SD, an axial distance between the object-side surface of the first lens element and the image-side surface of the sixth lens element is TD, and the following conditions are satisfied:

$0.70 < TL/f < 2.85$; and $0.65 < SD/TD$.

33. The optical imaging lens assembly of claim 32, wherein at least one of the object-side surface and the image-side surface of the third lens element has at least one inflection point, and the fifth lens element has positive refractive power.

34. The optical imaging lens assembly of claim 32, wherein each of the six lens elements of the optical imaging lens assembly is a single and non-cemented lens element, the axial distance between the object-side surface of the first lens element and the image surface is TL, the focal length of the optical imaging lens assembly is f, and the following condition is satisfied:

$0.70 < TL/f < 2.45$.

35. The optical imaging lens assembly of claim 32, wherein each of at least three of the six lens elements of the optical imaging lens assembly has an Abbe number less than 30.

36. The optical imaging lens assembly of claim 32, wherein an absolute value of a focal length of the second lens element is a minimum among absolute values of focal lengths of the six lens elements of the optical imaging lens assembly.

37. The optical imaging lens assembly of claim 32, wherein an axial distance between the fifth lens element and the sixth lens element is smaller than an axial distance between the second lens element and the third lens element.

* * * * *